(12) United States Patent
Ouda et al.

(10) Patent No.: US 10,277,077 B2
(45) Date of Patent: Apr. 30, 2019

(54) RF-TO-DC POWER CONVERTERS FOR WIRELESS POWERING

(71) Applicant: KING ABDULLAH UNIVERSITY OF SCIENCE AND TECHNOLOGY, Thuwal (SA)

(72) Inventors: Mahmoud Hamdy Ouda, Thuwal (SA); Khaled Nabil Salama, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 15/556,118

(22) PCT Filed: May 26, 2016

(86) PCT No.: PCT/IB2016/053094
§ 371 (c)(1),
(2) Date: Sep. 6, 2017

(87) PCT Pub. No.: WO2016/189492
PCT Pub. Date: Dec. 1, 2016

(65) Prior Publication Data
US 2018/0069486 A1 Mar. 8, 2018

Related U.S. Application Data

(60) Provisional application No. 62/166,275, filed on May 26, 2015.

(51) Int. Cl.
*H02J 5/00* (2016.01)
*H04B 5/00* (2006.01)
(Continued)

(52) U.S. Cl.
CPC ............. *H02J 50/20* (2016.02); *H02J 5/00* (2013.01); *H02J 50/80* (2016.02); *H02M 7/02* (2013.01);
(Continued)

(58) Field of Classification Search
CPC .......... H02M 7/02; H02M 7/21; H02M 7/219; H02M 2007/2195; H02J 5/00; H02J 5/20; H02J 50/20; H04B 5/0037
See application file for complete search history.

(56) References Cited

U.S. PATENT DOCUMENTS 6,172,608 B1 * 1/2001 Cole .................... G06K 7/0008
340/10.4
6,427,065 B1 * 7/2002 Suga .................... G06K 7/0008
455/41.1
(Continued)

FOREIGN PATENT DOCUMENTS

| CN | 103956920 B | | 8/2016 | |
|---|---|---|---|---|
| JP | 2008-011584 | * | 1/2008 | .............. H02M 7/12 |
| JP | 2008011584 A | | 1/2008 | |

OTHER PUBLICATIONS

"Rectifier circuit", English Abstract of JP 2008-011584, Nov. 4, 2014, 1 page.*
(Continued)

*Primary Examiner* — Duc M Nguyen
(74) *Attorney, Agent, or Firm* — Patent Portfolio Builders PLLC

(57) ABSTRACT

Various examples are provided related to radio frequency (RF) to direct current (DC) power conversion. In one example, a RF-to-DC converter includes a fully cross-coupled rectification circuit including a pair of forward rectifying transistors and a feedback circuit configured to provide feedback bias signals to gates of the pair of forward rectifying transistors via feedback branch elements. In
(Continued)

another example, a method includes receiving a radio frequency (RF) signal; rectifying the RF signal via a fully cross-coupled rectification circuit including a pair of forward rectifying transistors; and providing a DC output voltage from an output connection of the fully cross-coupled rectification circuit, where gating of the pair of forward rectifying transistors is controlled by feedback bias signals provided to gates of the pair of forward rectifying transistors via feedback branch elements.

15 Claims, 22 Drawing Sheets

(51) Int. Cl.
*H02M 7/02* (2006.01)
*H02J 50/20* (2016.01)
*H02J 50/80* (2016.01)
*H02M 7/219* (2006.01)

(52) U.S. Cl.
CPC ........... *H04B 5/0037* (2013.01); *H02M 7/219* (2013.01); *H02M 2007/2195* (2013.01)

(56) References Cited

U.S. PATENT DOCUMENTS

| | | | | |
|---|---|---|---|---|
| 7,167,090 | B1* | 1/2007 | Mandal | H01Q 1/2225 340/538.14 |
| 8,045,947 | B2 | 10/2011 | Mandal et al. | |
| 9,184,671 | B2* | 11/2015 | Yoshida | H02M 7/217 |
| 9,800,094 | B2* | 10/2017 | Liu | H01L 29/7391 |
| 2003/0021158 | A1* | 1/2003 | Gomez | G06K 19/0723 365/233.1 |
| 2004/0008013 | A1* | 1/2004 | Gay | G05F 1/613 323/273 |
| 2005/0205679 | A1* | 9/2005 | Alihodzic | G06K 19/0701 235/492 |
| 2015/0076920 | A1* | 3/2015 | Zargham | H02J 5/005 307/104 |
| 2015/0280606 | A1* | 10/2015 | Yoshida | H02M 7/217 307/11 |
| 2015/0364928 | A1* | 12/2015 | Yen | H04B 5/0037 320/108 |

OTHER PUBLICATIONS

Arsalan, M., et al., "A 5.2GHz, 0.5mW RF Powered Wirelss Sensor with Dual On-Chip Antennas for Implantable Intraocular Pressure Monitoring," Microwave Symposium Digest (MTT), 2013 IEEE MTT-S International, 2013.

Brown, W.C., "The History of Power Transmission by Radio Waves," IEEE Transactions on Microwave Theory and Techniques, Sep. 1984, vol. MTT-32, No. 9, pp. 1230-1242.

Giannakas, G. et al., "Pseudo-FG Technique for Efficient Energy Harvesting", Electronics Letters, IEE Stevenage, GB, Apr. 2012, vol. 48, No. 2, pp. 522-523.

International Search Report in related International Application No. PCT/IB2016/053094 dated Oct. 7, 2016.

Kotani, K., et al., "High-Efficiency Differential-Drive CMOS Rectifier for UHF RFIDs," IEEE Journal of Solid-State Circuits, Nov. 2009, vol. 44, No. 11, pp. 3011-3018.

Le, T., et al., "Efficient Far-Field Radio Frequency Energy Harvesting for Passively Powered Sensor Networks," IEEE Journal of Solid-State Circuits, May 2008, vol. 43, No. 5, pp. 1287-1302.

Lee, H-M, et al., "An Adaptive Reconfigurable Active Voltage Doubler-Rectifier for Extended-Range Inductive Power Transmission," IEEE Transactions on Circuits and Systems—II: Express Briefs, 2012, pp. 286-288.

Mandal, S., et al., "Low-Power CMOS Rectifier Design for RFID Applications," IEEE Transactions on Circuits and Systems—I: Regular Papers, Jun. 2007, vol. 54, No. 6.

Marnat, L., et al., "On-Chip Implantable Antennas for Wireless Power and Data Transfer in a Glaucoma Monitoring SoC," Antennas and Wireless Propagation Letters, IEEE, 2012, vol. 11, pp. 1671-1674.

Ouda, M.H., et al., "5/2-GHz RF Power Harvester in 0.18-μm CMOS for Implantable Intraocular Pressure Monitoring," IEEE Transactions on Microwave Theory and Techniques, May 2013, vol. 61, No. 5, pp. 2177-2184.

Written Opinion of the International Searching Authority in related International Application No. PCT/IB2016/053094 dated Oct. 7, 2016.

* cited by examiner

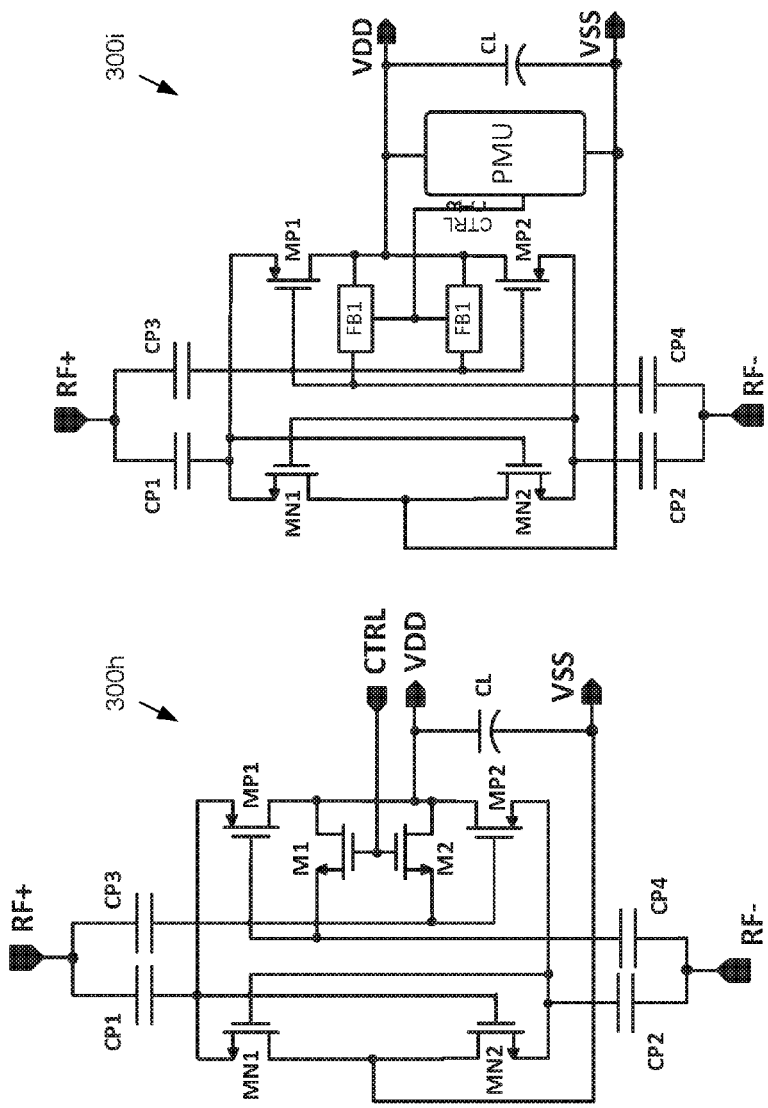

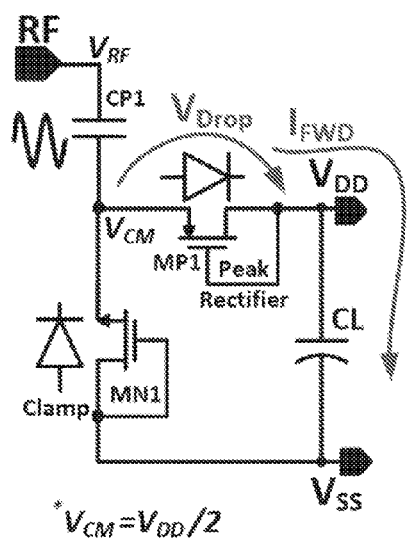
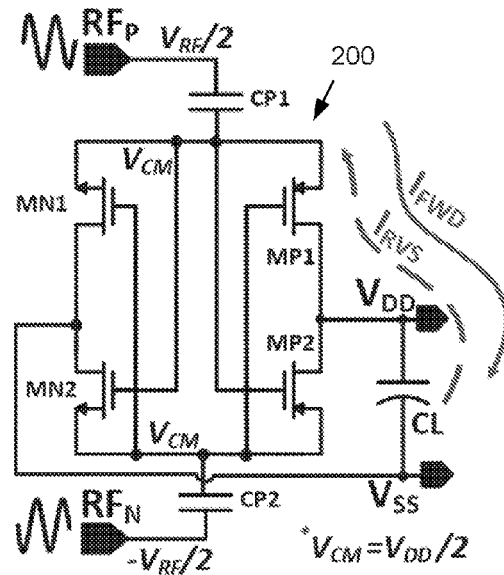
FIG. 6A  FIG. 6B
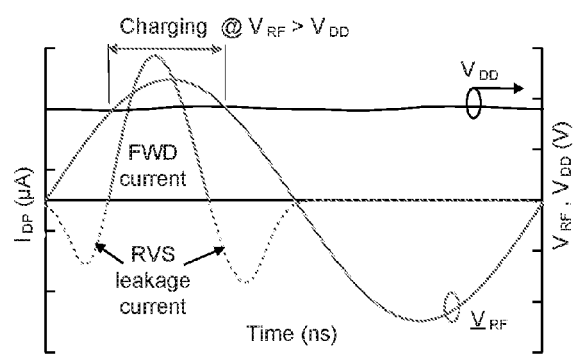
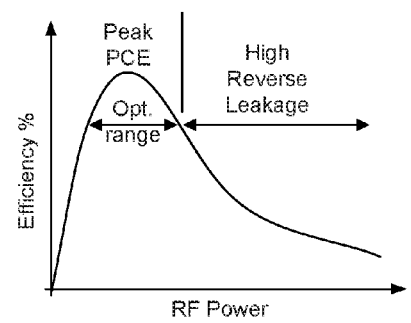
FIG. 7A  FIG. 7B

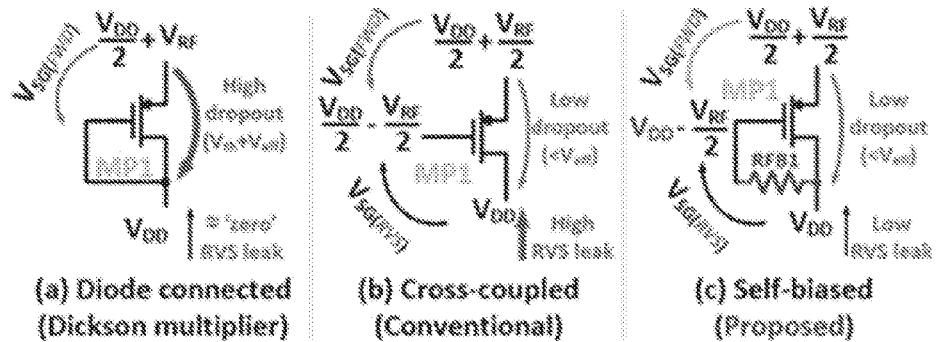
FIG. 10
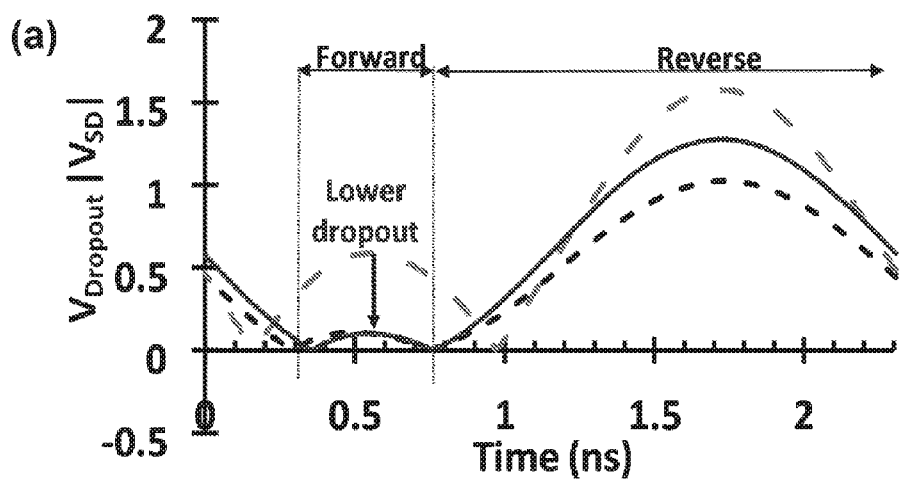
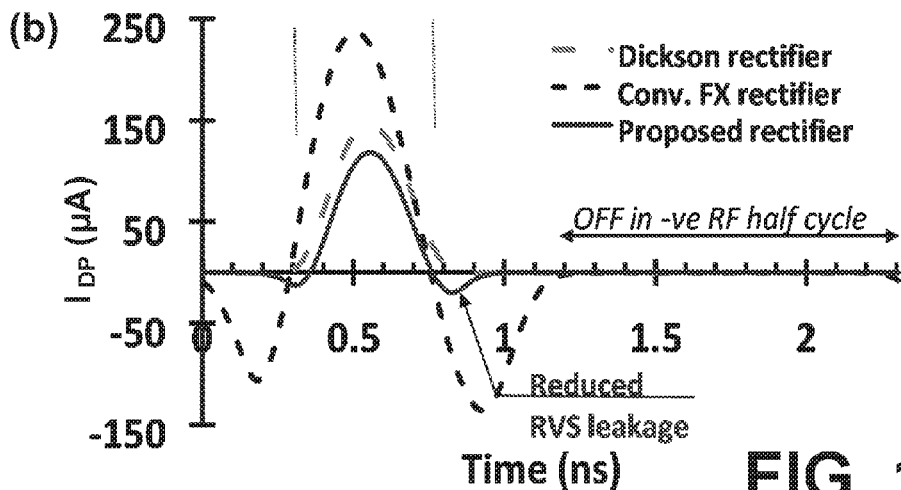
FIG. 11

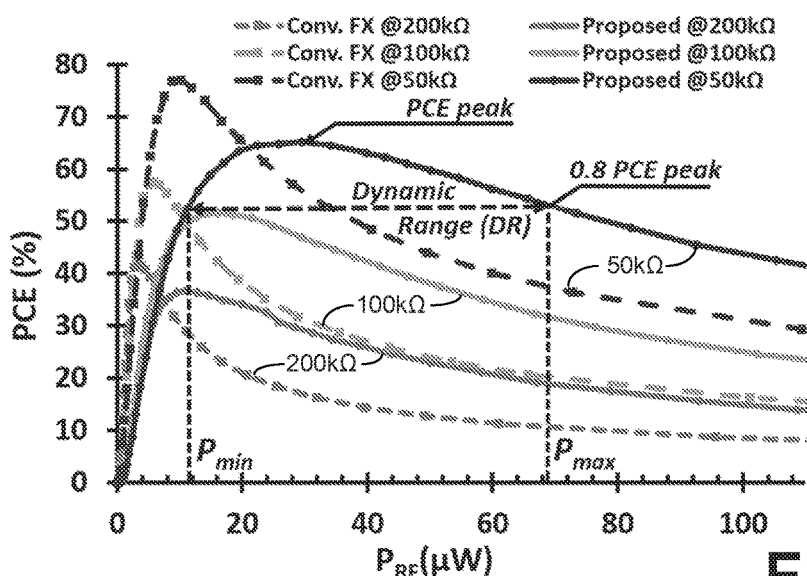

COMPARISON OF RECTIFYING DEVICES

| Rectifier | Dickson | Conv. FX | Proposed |
|---|---|---|---|
| Device | D-connected | X-coupled | Self-biased |
| Turn-on[1] ($V_{RFmin}$) | High ($=V_{DD}/2+V_{th}$) | Low ($=V_{th}$) | High ($=V_{DD}/2+V_{th}$) |
| Dropout[2] ($V_{drop}$) | High (Sat.) ($=V_{th}+V_{eff}$) | Low (Linear) ($=V_{eff}$) | Low (Linear) ($=V_{eff}$) |
| Sensitivity[3] | Poor | Good | Moderate |
| RVS leak | Negligible | High, $I_{S\,MOS}$ | Low |
| RVS Leakage Range[4] | Negligible leak $V_{RF}>V_{breakdown}$ | Wide leak $2V_{th}-V_{DD}<V_{RF}$ $<V_{RF}<V_{DD}$ | Low leak $2V_{th}<V_{RF}$ $V_{RF}<V_{DD}$ |
| Efficiency (PCE) | Low peak Moderate-range | High peak Narrow-range | Good peak Wide-range |

[1] Turn-on at $V_{SG}>V_{th}$.
[2] Dropout affects sensitivity, output voltage and efficiency.
[3] Sensitivity: turn on at low $V_{RF}$ & with low dropout voltage.
[4] Reverse leakage if ($V_{SG\,(RVS)}>V_{th}$) & ($V_{SD\,(RVS)}>0$).

PERFORMANCE COMPARISON.

| CMOS Process | Architecture | # stages | Chip Area ($mm^2$) | Frequency | Sensitivity $P_{RF}@V_O=1V$ | Load ($R_L$) | Peak PCE | Dynamic Range[a] $P_{max}/P_{min}$ |
|---|---|---|---|---|---|---|---|---|
| 0.18 $\mu m$ | Adaptive self-biased crossconnected rectifier (Proposed) | 1-stage | 0.017 | 433 MHz | -15.2 dBm | 50 k$\Omega$ | 65.3 % | 6.5 |
| | | | | | -17 dBm | 100 k$\Omega$ | 51.5 % | 6.2 |
| 0.18 $\mu m$ | Fully cross-coupled (FX) rectifier (Conventional) | 1-stage | 0.005 | 433 MHz | -13.6 dBm | 50 k$\Omega$ | 77 % | 4.5 |
| | | | | | -14.5 dBm | 100 k$\Omega$ | 57.5 % | 4.1 |
| 0.18 $\mu m$ | Fully cross-coupled with inter-stage RF injection | 3-stage | 0.088 | 433 MHz | -7.8 dBm | 30 k$\Omega$ | 13.2 % | 3.2 |
| | | | | | -4.1 dBm | 100 k$\Omega$ | 10 % | 3 |
| 0.18 $\mu m$ | Dickson rectifier with multiple $V_{th}$ offset cancellation. | 4-stage | 0.15 | 433 MHz | -11.2 dBm | 50 k$\Omega$ | 32 % | 4.2 |
| | | | | | -14 dBm | 100 k$\Omega$ | 34 % | 4.7 |
| 0.18 $\mu m$ | Hybrid $V_{th}$ cancellation using RF input & DC output voltage | 1-stage | NA | 433 MHz | > 0 dBm[b] | 30 k$\Omega$ | 12.5 % | 3.3 |
| | | | | | > 0 dBm[b] | 100 k$\Omega$ | 4.6 % | 3.6 |

FIG. 17

PERFORMANCE COMPARISON.

| Process | Configuration | Sensitivity | Peak PCE | Opt. Range[a] $P_{max}/P_{min}$ |
|---|---|---|---|---|
| 0.18$\mu m$ | 1-stage, Proposed Adaptive[b] | -18 dBm[c] @Vo=1V | 65%[c] | 4.6x[c] |
| 0.18$\mu m$ | 1-stage, Standard cross-coupled | -14.8 dBm[c] @Vo=1V | 63%[c] | 2.7x[c] |
| 0.18$\mu m$ | 1-stage, Standard cross-coupled | -12.8 dBm[c] @Vo=1V | 82.6%[c] | 2.7x[c] |
| 0.25$\mu m$ | 36-stage, floating gate doubler | -14.6dBm[d] @Vo=1V | 60.7%[d] | 2x[d] |
| 90$nm$ | 5-stage, Standard cross-coupled | -20 dBm[d] @Vo=1V | 40%[d] | 2.4x[d] |
| 0.13$\mu m$ | 12-stage, Adaptive $V_{th}$ compensated | -17dBm[f] @Vo=1V | 32%[f] | 2.9x[f] |
| 0.13$\mu m$ | 4-stage, Reconfigurable | -21dBm[e] @Vo=2V | 60%[e] | 4.4x[e] |

[a]Input power range of PCE>0.9 Peak PCE, [b]Intra-stage, [c]@100k$\Omega$, [d]@330k$\Omega$, [f]@500k$\Omega$, [e]@ tracking load (regulator with external ref.

FIG. 23

RF-TO-DC POWER CONVERTERS FOR WIRELESS POWERING

CROSS REFERENCE TO RELATED APPLICATIONS

This application claims priority to, and the benefit of, co-pending U.S. provisional application entitled "RF-TO-DC POWER CONVERTERS FOR WIRELESS POWER RECEIVERS" having Ser. No. 62/166,275, filed May 26, 2015, which is hereby incorporated by reference in its entirety.

BACKGROUND

Wireless power transfer is a vital part of radio frequency (RF) energy harvesting or wireless powering of systems. Applications range from radio frequency identification (RFID) tags and battery-less sensors for biomedical applications to wirelessly charging smart phones and consumer electronics, and even electric vehicles, or other environmental applications. One of the largest range application is wireless powering channel in the space based solar power systems.

SUMMARY

Embodiments of the present disclosure are related to radio frequency (RF) to direct current (DC) power conversion and applications thereof.

In one embodiment, among others, a radio frequency to direct current (RF-to-DC) converter comprises a fully cross-coupled rectification circuit including a pair of forward rectifying transistors; and a feedback circuit configured to provide feedback bias signals to gates of the pair of forward rectifying transistors via feedback branch elements. In one or more aspects of these embodiments, the feedback branch elements can comprise controlled elements. The controlled elements can be MOSFET transistors. The feedback branch elements can be resistors. The feedback bias signals can be supplied from a common control input via the feedback branch elements. The feedback bias signals can be supplied from a common bias input via the feedback branch elements, the feedback bias signals controlled via a common control input. In one or more aspects of these embodiments, the RF-to-DC converter can comprise a power management unit (PMU) coupled to the common control input. The PMU can provide a control signal to the common control input based at least in part upon an output voltage of the RF-to-DC converter. The feedback bias signals can be supplied from a common output connection of the pair of forward rectifying transistors via the feedback branch elements. The common output connection can couple drains of the pair of forward rectifying transistors. The RF-to-DC converter can comprise input pumping capacitors coupled between RF input connections and the fully cross-coupled rectification circuit.

In another embodiment, a method comprises receiving a radio frequency (RF) signal; rectifying the RF signal via a fully cross-coupled rectification circuit including a pair of forward rectifying transistors; and providing a DC output voltage from an output connection of the fully cross-coupled rectification circuit, where gating of the pair of forward rectifying transistors is controlled by feedback bias signals provided to gates of the pair of forward rectifying transistors via feedback branch elements. In one or more aspects of these embodiments, the method can comprise sensing the DC output voltage and providing a control signal to the feedback branch elements based upon the DC output voltage. The control signal can be provided by a power management unit (PMU) configured to sample the DC output voltage. The control signal can be provided by a transistor sensing network coupled to the output connection of the fully cross-coupled rectification circuit. The feedback branch elements can be resistors coupled between the gates of the pair of forward rectifying transistors and the output connection. The RF signal can be a UHF signal at, e.g., 433 MHz or 950 MHz.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 3A through 3K are schematic diagrams illustrating various embodiments of adaptive and/or reconfigurable wide range rectifiers in accordance with various embodiments of the present disclosure.

FIGS. 6A and 6B are schematic diagrams illustrating examples of a Dickson rectifier and a conventional fully cross-coupled (FX) rectifier, respectively, in accordance with various embodiments of the present disclosure.

FIG. 7A and 7B are plots illustrating examples of simulation results of a conventional FX rectifier in accordance with various embodiments of the present disclosure.

FIG. 10 includes schematic diagrams illustrating examples of operating points of the rectifying device (MP1) of the Dickson rectifier of FIG. 6A, conventional FX rectifier of FIG. 6B, and self-biased rectifier of FIG. 8 in accordance with various embodiments of the present disclosure.

FIGS. 11 and 12 includes plots illustrating examples of simulation results of the Dickson rectifier of FIG. 6A, conventional FX rectifier of FIG. 6B, and self-biased rectifier of FIG. 8 in accordance with various embodiments of the present disclosure.

FIG. 13 is a table comparing simulation results of the Dickson rectifier of FIG. 6A, conventional FX rectifier of FIG. 6B, and self-biased rectifier of FIG. 8 in accordance with various embodiments of the present disclosure.

FIGS. 14, 15 and 16 include plots illustrating examples of evaluation results of the conventional FX rectifier of FIG. 6B and self-biased rectifier of FIG. 8 in accordance with various embodiments of the present disclosure.

FIG. 17 is a table comparing performance characteristics of the self-biased rectifier of FIG. 8 and other conventional rectifiers in accordance with various embodiments of the present disclosure.

FIG. 23 is a table comparing performance characteristics of the adaptive rectifier of FIG. 18 and other conventional rectifiers in accordance with various embodiments of the present disclosure.

DETAILED DESCRIPTION

Figure 1:
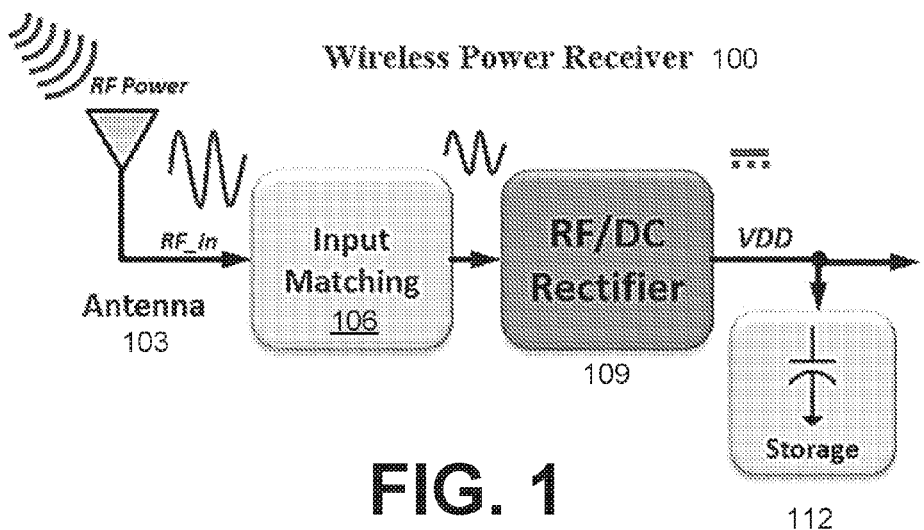
FIG. 1 is a block diagram of an example of a wireless power receiver in accordance with various embodiments of the present disclosure.

Disclosed herein are various embodiments of methods, devices, apparatus and/or systems related to radio frequency (RF) to direct current (DC) power conversion. Reference will now be made in detail to the description of the embodiments as illustrated in the drawings, wherein like reference numbers indicate like parts throughout the several views.

Wireless powering can facilitate the transmission of electrical power wirelessly from generators to consumers by transmitting, e.g., solar power from space-based solar cells to a receiving station on the earth by a wireless powering microwave link. On the other scale, wireless powering can enable the use of battery-less devices such as RFID tags used in supply chain, access cards, logistics, tracking animals and goods. These passive, wirelessly powered tags can serve in biomedical implantable devices to provide improved health care. With the advance in the scaling of integrated circuits and the wide variety of the available sensors, wireless powering can be used to open doors for the Internet of the Things (IoT).

Research to make wireless powering links more efficient ranges from the selection of a suitable frequency and the design of the transmitting and receiving antennas, to work on the RF-to-DC power converters. These power converters are considered the core of a wireless power receiver and can define the efficiency of the wireless powering link. Mainly, AC-to-DC voltage rectifiers are used to convert the received RF power to a usable DC power that can be stored in a storage capacitor to provide a sustainable power supply. FIG. 1 shows block diagram of an example of a wireless power receiver 100, which includes an antenna 103, an input matching network 106 and an RF-to-DC power converter 109 that outputs DC power to an energy storage and power management unit 112.

Figure 2A:
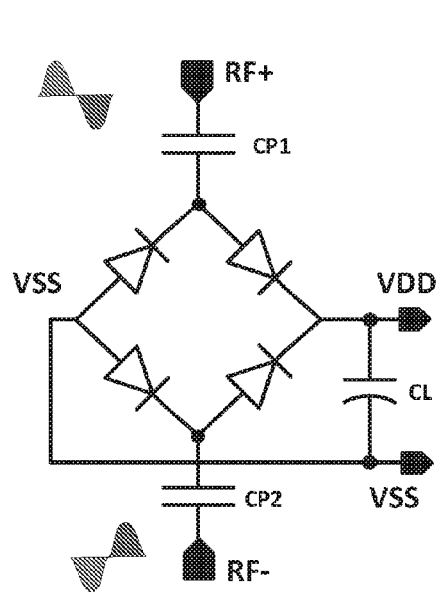
FIGS. 2A and 2B are schematic diagrams of a full wave bridge rectifier and a fully cross-coupled (FX) rectifier, respectively, in accordance with various embodiments of the present disclosure.

One of the most common implementations for the RF-to-DC power converter 109 is a full wave bridge rectifier. FIG. 2A shows a schematic diagram of a full wave bridge rectifier. The operation depends on the rectification property of the electronic diodes and provides full wave current rectification of the received AC power. But, it requires a minimum input voltage higher than twice the diode built-in voltage to start the rectification and its four diodes still carry a voltage drop equals this built-in voltage. This degrades both the sensitivity and the efficiency of the AC-to-DC power converter, and thus the entire wireless power receiver. Sensitivity is related to the minimum RF input power (AC power) level needed by the rectifier to generate an acceptable (or usable) output DC voltage level to supply and operate the load circuits. A possible but expensive solution is to implement the full wave diode rectifier using Schottky diodes with a very low built-in voltage, but these diodes are not usually available in common low cost CMOS technologies. If they are available through high cost special CMOS processes, they generally have less accurate models for reliable design and development cycles. Other implementations have equivalent rectifier structures that may be achievable on conventional CMOS technologies.

Figure 2B:
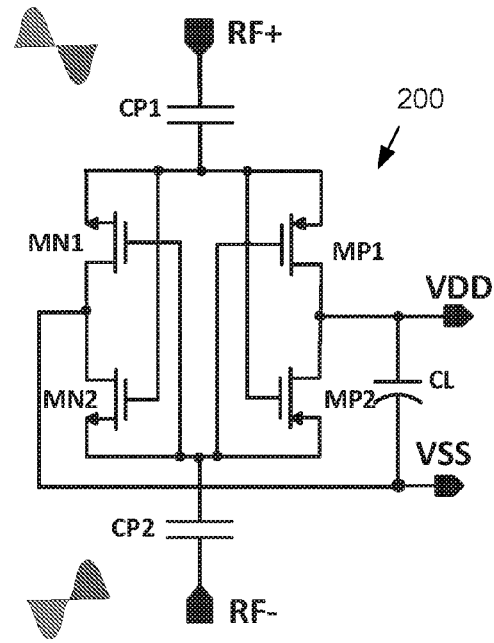

One implementation of the AC-to-DC power converter can use fully cross-coupled MOSFET devices. FIG. 2B shows a schematic diagram of a fully cross-coupled (FX) rectifier 200. It can achieve a significant improvement in both the sensitivity and the efficiency of the power converter. But, includes a main limiting factor for the power conversion efficiency that makes it only efficient over a narrow range of input RF power levels. If the input RF power level exceeds a certain threshold, it starts leaking the stored energy from the storage to the input port. This reverse leakage deteriorates the power conversion efficiency at high RF power levels. Other implementations include an adaptive reconfigurable rectifier that utilizes fast comparators at 13 MHz, but that cannot be used at higher frequencies such as 950 MHz UHF RFID and a reconfigurable rectifier architecture on an intra-stage level using a reconfigurable connectivity between the rectifier stages.

Wide Range RF-to-DC Power Converter Architecture

An efficient, wide range RF-to-DC power converter stage architecture that can operate efficiently over more than double the RF input range of the fully cross-coupled rectifier and without degrading the sensitivity of the wireless power receiver will be presented in this disclosure. It mitigates the reverse leakage problem in fully cross-coupled rectifiers without degrading the sensitivity. It is designed and optimized for UHF 950 MHz RFID application and can be implemented using, e.g., AMS 0.18 µm CMOS technology or other suitable low cost CMOS technology process. It achieves a peak RF-to-DC power conversion efficiency of about 75% and maintains RF-to-DC power conversion efficiency (PCE) higher than 40% for a 16 dB dynamic range of input RF power levels. This dynamic range is more than double that of the standard fully cross-coupled rectifier. At same time, it can achieve a sensitivity of −17 dBm input RF power to provide output DC voltage of one Volt to a typical load of 100 kΩ.

Figure 3A:
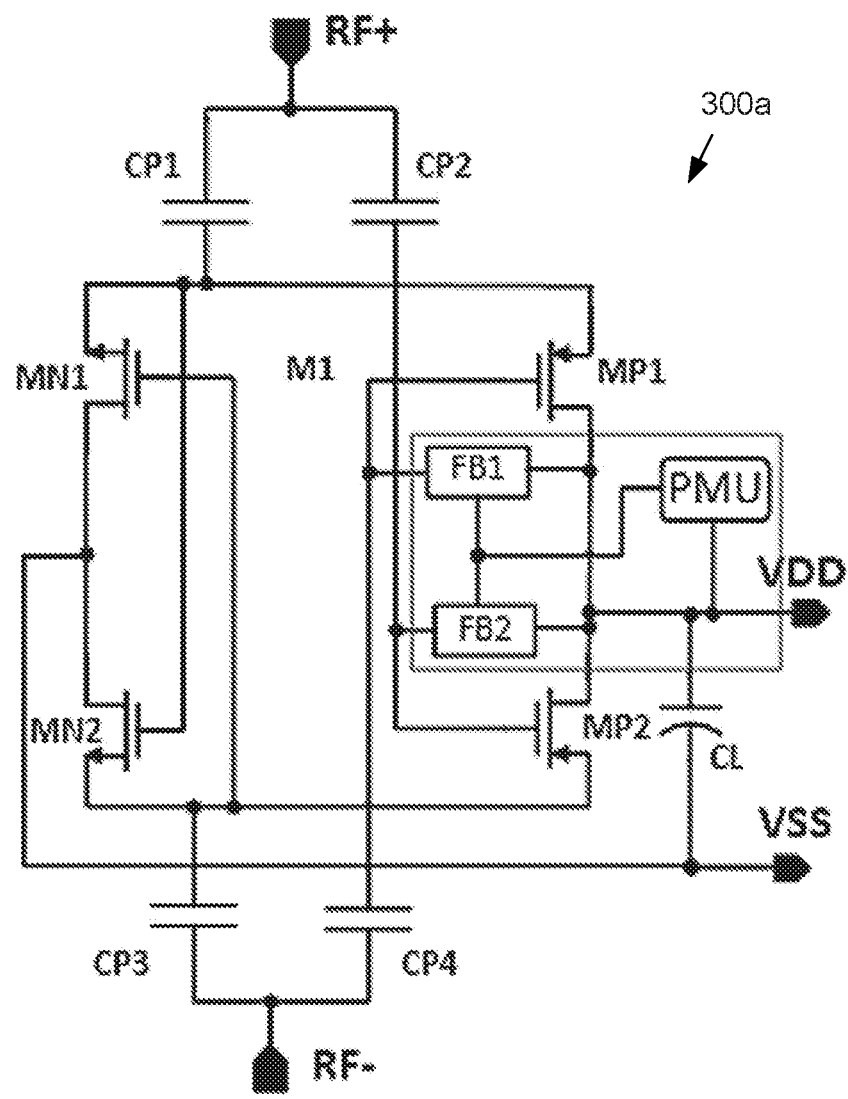

Referring now to FIG. 3A, shown is a schematic diagram illustrating an example of a wide range fully cross-coupled rectifier architecture 300a in accordance with various embodiments of the present disclosure. The wide range rectifier 300a can be designed and implemented using conventional, low cost, CMOS 0.18 μm technology. The PMOS transistors (MP1 and MP2) and the NMOS transistors (MN1 and MN2) are the rectifying devices and capacitors CP1 through CP4 are the input pumping capacitors. The pumping capacitors (CP1-CP4) provide two functions. They pump the charges from the RF input through the rectifying devices to the output storage capacitor, as well as decouple the DC bias of the gates of MP1 and MP2 from the gates of MN1 and MN2.

At low input RF power levels, the fully cross-coupled rectifying devices (MP1, MP2 MN1, MN2) start rectifying at a very sensitive level of RF input voltage in the same way as a standard fully cross-coupled rectifier. At high RF input power levels, the standard fully cross-coupled rectifier 200 shown in FIG. 2B suffers from reverse leakage that deteriorates its power conversion efficiency. The power conversion efficiency (PCE) can be expressed as the ratio of the usable DC output power $P_{DC}$ to the RF input power $P_{RF}$ or the ratio of the usable DC output power $P_{DC}$ to the total summation of the usable DC power and the total power loss $P_{Loss}$ including the dissipation power loss $P_D$ and the reverse leakage power loss $P_{RVS}$.

$$PCE = \frac{P_{DC}}{P_{RF}} = \frac{P_{DC}}{P_{DC} + P_D + P_{RVS}}. \quad (1)$$

The dissipation loss is the power dissipated internally in the rectifying devices of the RF-to-DC power converter and is directly related to the drop voltage over the rectifying devices times the conducting current in the devices. The reverse leakage loss is due to reverse leakage power that leaks from the charged output storage capacitor (CL) back to the antenna through the rectifying devices. As the input power increases, the leakage power loss $P_{RVS}$ dominates the power loss and degrades the power conversion efficiency significantly. Other power losses can include mismatch loss where power is reflected due to an impedance mismatch between the antenna 103 (FIG. 1) and the rectifier (109). As shown in FIG. 1, input matching 106 can be used to reduce this effect.

On the other hand, the wide range rectifier 300a can start a smart DC biasing mechanism to the gates of the forward rectifying devices (MP1 and MP2) through the feedback branch devices (FB1 and FB2) to limit the undesired reverse leakage power loss from the energy storage capacitor (CL), which charges and holds the output DC voltage. The feedback branches include biasing elements to bias the gates of the forward rectifying devices (MP1 and MP2). The biasing elements (FB1 and FB2) can be implemented by, e.g., voltage controlled switches such as a MOSFET transistor operating in linear region (acting as a voltage controlled resistor) or by resistors (as there is no DC current flowing into the MOSFET gates). The feedback branches can provide a DC short circuit and an RF open circuit, similar to an RF Chock.

This DC biasing mechanism can be controlled by a power management unit (PMU) as shown in FIG. 3A. The PMU can sense and/or sample the output voltage of the rectifier 300a, and provide a control signal (CTRL) to control the feedback branches based at least in part upon the output voltage. The PMU can comprise processing circuitry including a processor (or a system on chip (SoC) or microprocessor) or can be implemented with transistors. The output voltage sampling can be implemented by, e.g., a diode connected MOS transistor and a series resistor (or MOSFET in triode region). In other implementations, the microprocessor or SoC can include analog-to-digital converters for sampling the output voltage.

The gates of the PMOS transistors (MP1 and MP2) are decoupled from the corresponding NMOS transistors (MN1 and MN2), so that they can be biased and controlled independently. This smart active biasing is mainly controlled by the output voltage level. So that when the RF input power level increases, the feedback mechanism will start working smartly to limit the undesired reverse leakage power loss from the energy storage capacitor (CL). This boosts the RF-to-DC power conversion efficiency as expressed in Equation (1). By suppressing the reverse leakage power loss, the rectifier 300a achieves higher power conversion efficiency and also higher output DC voltage in the range of high RF input power levels, while maintaining the sensitive performance at low RF input power levels.

Figures 3B, 3C:
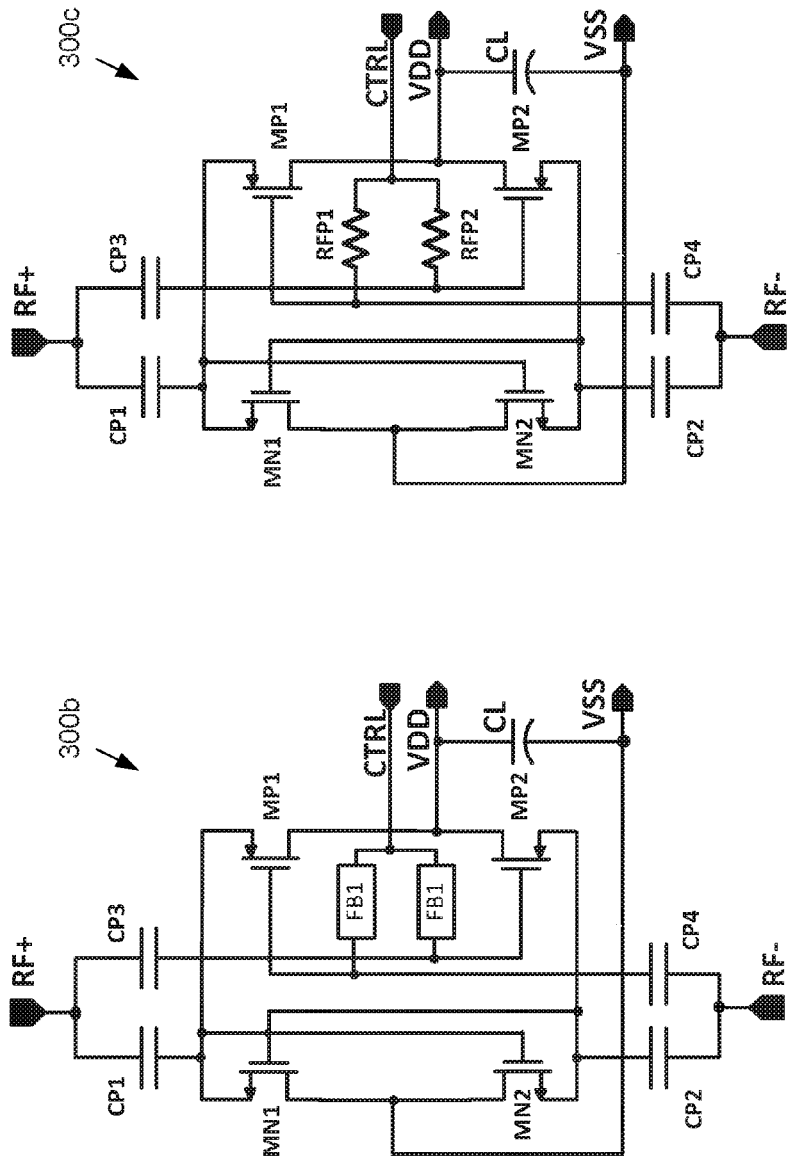
Figure 3E:
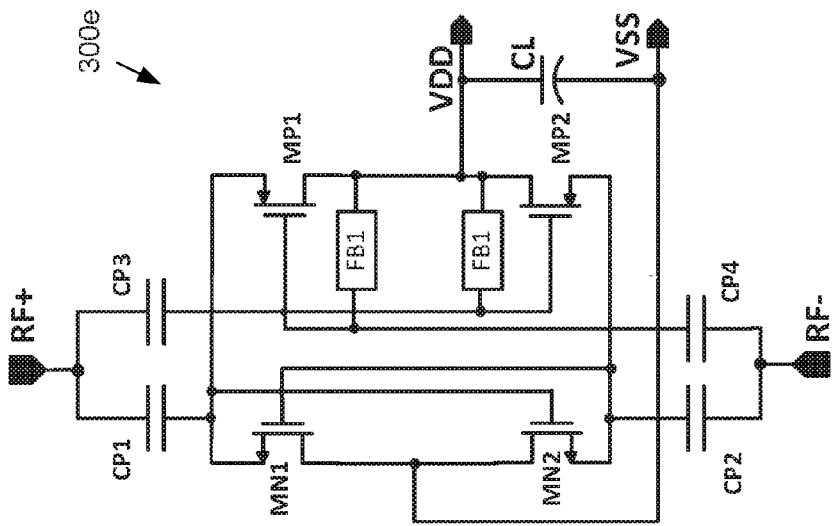
Figure 3D:
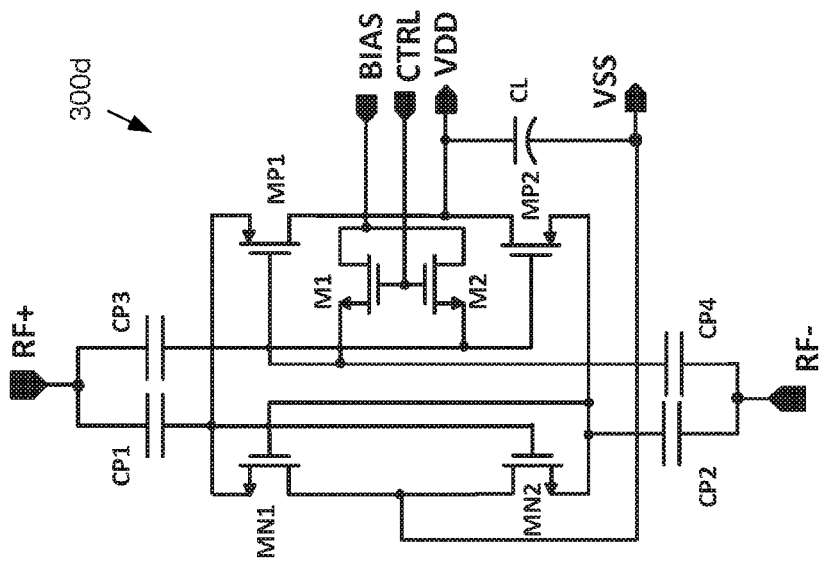

Referring next to FIGS. 3B-3D, shown are schematic diagrams illustrating examples of a reconfigurable wide range rectifier architecture 300. As shown in the rectifier 300b of FIG. 3B, the DC voltage of the gates of the rectifying devices MP1 and MP2 are decoupled from the gates of devices MN1 and MN2 by adding two pumping capacitors (CP3 and CP4). The rectifying devices (MP1 and MP2) can be controlled by applying a DC voltage (CTRL) to their gates via feedback elements (FB1 and FB2). By this control signal (CTRL), the rectifier 300b can be reconfigured to optimize its efficiency for a wider range of operating RF input power levels. The feedback elements (FB1 and FB2) should act as a DC short circuit and an AC (or RF) open circuit such as provided by an RF Choke (RFC). This can avoid disturbing the RF input power. In some implementations, the feedback elements (FB1 and FB2) can be implemented in a rectifier 300c by large resistors (RFP1 and RFP2) as shown in the example of FIG. 3C because, there is no dc current passing into the gates of the MOSFETs. In other implementations, the feedback elements (FB1 and FB2) can be implemented in a rectifier 300d by MOSFET transistors (M1 and M2) as shown FIG. 3D to avoid the parasitic capacitance of the large resistors (R1 and R2) in an on-chip implementation.

Figure 3G:
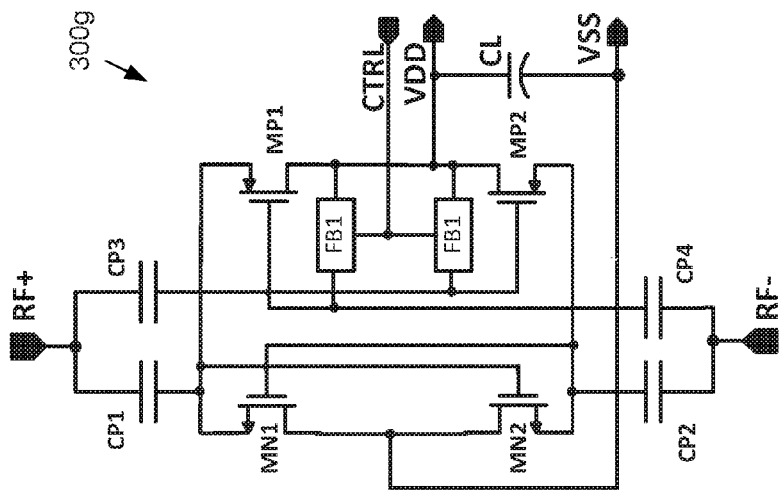
Figure 3F:
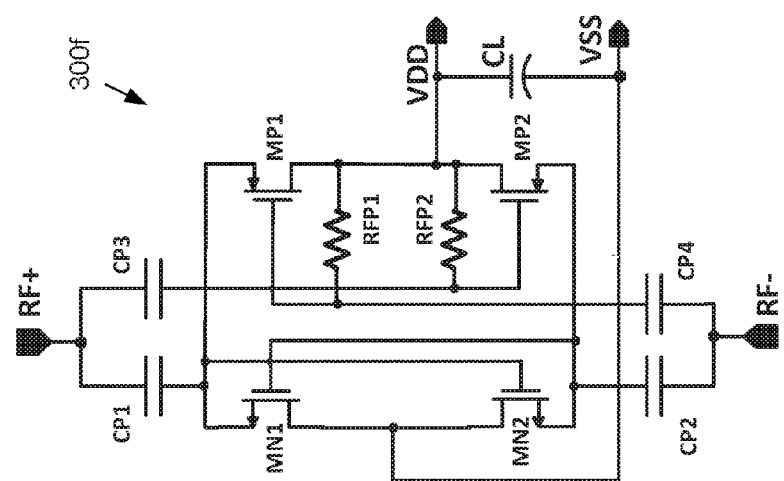

Referring next to FIGS. 3E and 3F, shown are schematic diagrams illustrating examples of a self-adaptive wide range rectifier architecture 300. The self-adaptive rectifiers 300 can work efficiently in various operating conditions. As shown in the rectifier 300e of FIG. 3E, the control signal (CTRL) is extracted from the rectifier 300e itself via the feedback elements (FB1 and FB2), so the rectifier 300e is self-biased in the appropriate direction. When the RF input power increases, the self-bias mechanism will limit the reverse leakage of the rectifying devices (MP1 and MP2) and enhance the overall power conversion efficiency. In some implementations, the feedback elements (FB1 and FB2) can be implemented by large resistors (RFP1 and RFP2) as shown in the rectifier 300f of FIG. 3F because there is no DC current passing into the gates of the MOSFETs.

Referring next to FIGS. 3G and 3H, shown are schematic diagrams illustrating examples of a reconfigurable, adaptive wide range rectifier architecture 300. As shown by the rectifier 300g of FIG. 3G, the self-feedback biasing branches (FB1 and FB2) can be controlled by a control signal (CTRL). In some implementations, the feedback elements (FB1 and FB2) can be implemented by MOSFET transistors (M1 and M2) in an on-chip implementation as shown the rectifier 300h in FIG. 3H. This architecture can provides better tracking to the rectifier condition and hence can provide the appropriate feedback to enhance the overall power conversion efficiency.

Figures 3J, 3K:
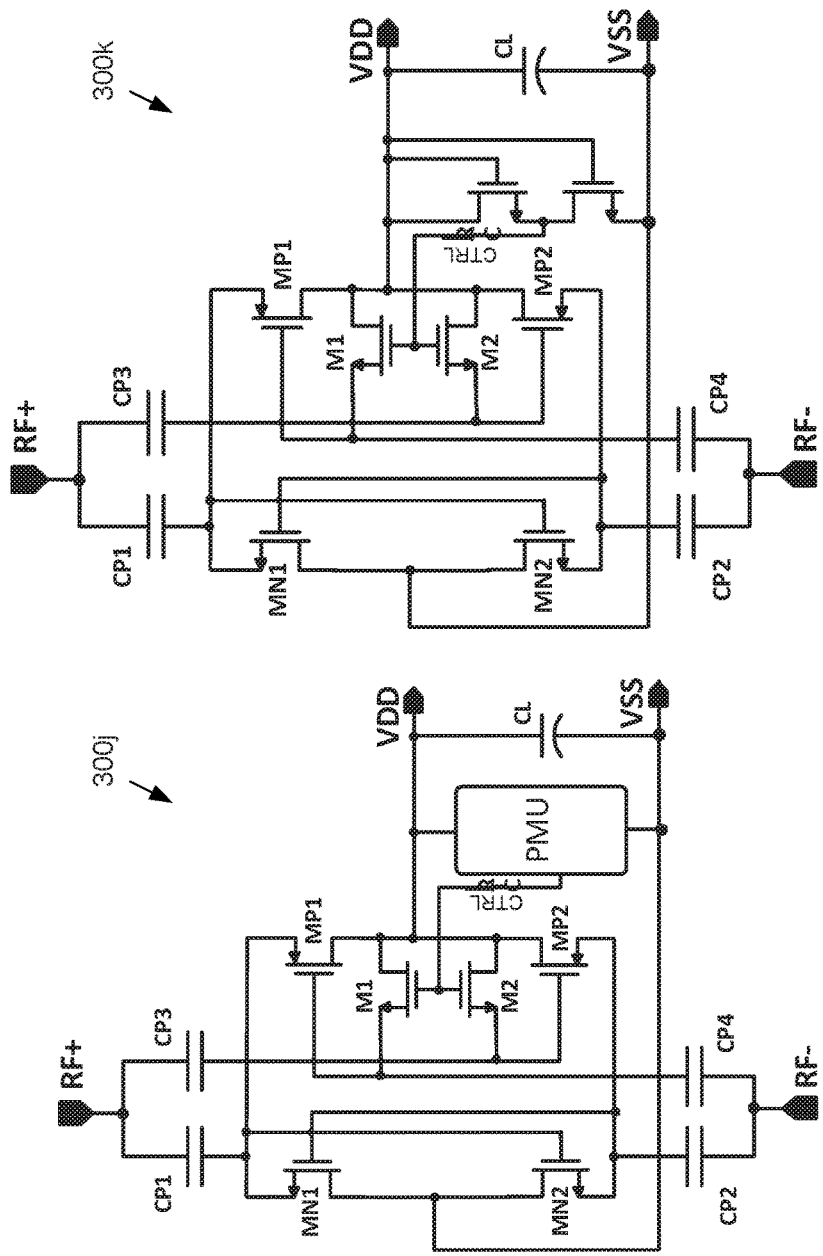

Referring next to FIGS. 3I-3K, shown are schematic diagrams illustrating examples of a reconfigurable, adaptive wide range rectifier architecture 300 with a power management unit (PMU) as a fully integrated module for system on chip (SOC) solutions. The control signal (CTRL) is internally generated from a power management unit (PMU) as shown in the rectifier 300i of FIG. 3I. In some implementations, the feedback elements (FB1 and FB2) can be implemented by MOSFET transistors (M1 and M2) as shown the rectifier 300j in FIG. 3J. A simple method to implement the power management unit (PMU) with transistors is illustrated in the rectifier 300k of FIG. 3K. In some embodiments, the PMU comprises a diode connected transistor and a resistive branch (implemented by a MOSFET operating in linear region).

It should be noted the described techniques are not limited to rectifying devices MP1 and MP2. In various embodiments, the described techniques can be applied to devices MN1 and MN2 either separately or in combination with MP1 and MP2 For example, the techniques can be applied to all of the rectifying devices MP1, MP2 MN1 and MN2 in a wide range of RF-to-DC power converters.

Simulation Results

Figure 4A:
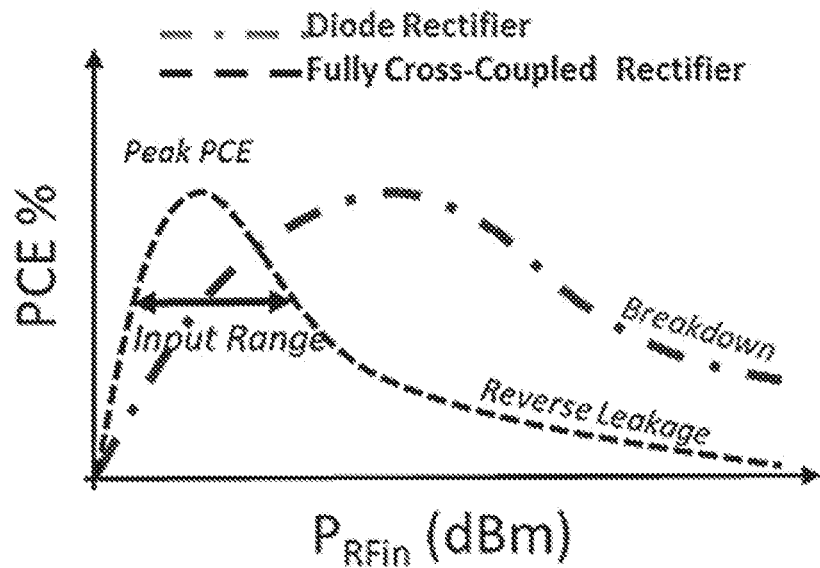
FIGS. 4A through 4C are plots illustrating examples of operational characteristics of full wave bridge, fully cross-coupled, and wide range rectifiers in accordance with various embodiments of the present disclosure.

The fully cross-coupled (FX) rectifier 200 of FIG. 2B is commonly used for RF-to-DC power converter in RFID and wireless power receivers. Although it shows an improved sensitivity (better than the diode based rectifier of FIG. 2A), it suffers from a severe drawback that degrades its overall power conversion efficiency (PCE) at high levels of input RF power. The plot of FIG. 4A illustrates the degradation due to the reverse leakage. This degradation of PCE of the fully cross-coupled rectifier 200 in the high range of RF input power may be attributed to the reverse leakage from the output storage capacitor to the input of the FX rectifier 200. This reverse leakage increases as the RF input power level increases.

While this loss mechanism is negligible in the diode based rectifier of FIG. 2A in which the reverse current is very small, reverse leakage is very significant in fully cross-coupled rectifiers 200. But, diode based rectifiers suffer from poor sensitivity and cannot work efficiently at low RF power levels as shown in FIG. 4A. So, the reverse leakage limits the input range of the fully cross-coupled rectifier 200 which is a commonly used sensitive rectifier. This limits the operating range of the wireless power receiver in terms of RF power levels and distance.

Figure 4B:
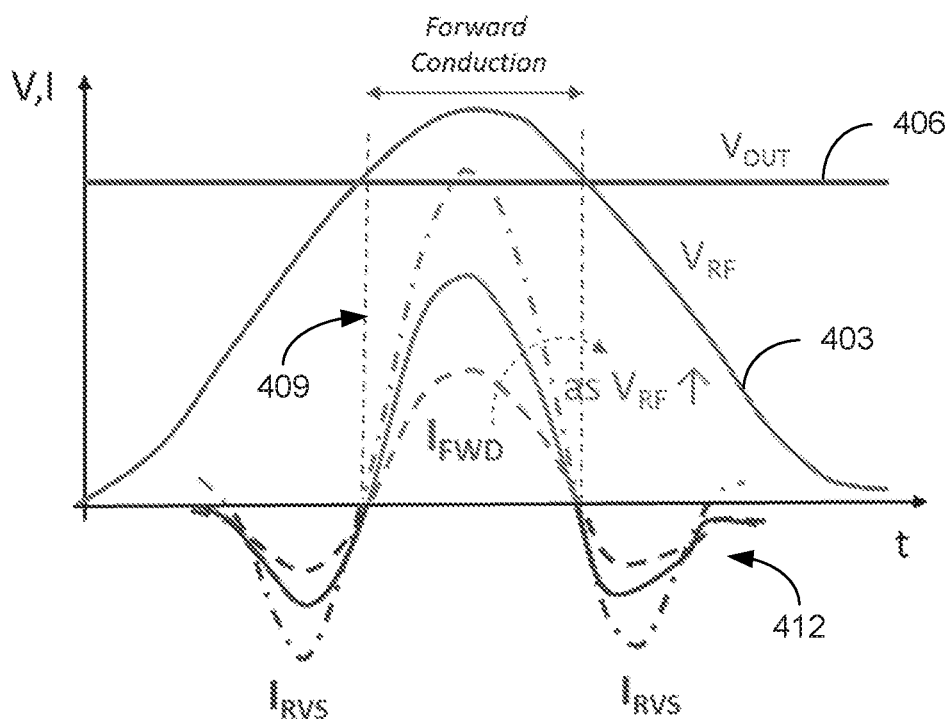

The reverse leakage mainly comes from the fact that the MOSFET is originally a bidirectional device and remains bidirectional in the fully cross-coupled rectifier architecture 300. FIG. 4B shows a half cycle of the RF input voltage (403) and its corresponding output DC voltage (406). When the instantaneous RF input voltage is less than the output DC voltage over the output storage capacitor (CL), the stored energy in the output storage capacitor leaks through the MOSFET in the reverse direction and producing a periodic discharging current that passes in the rectifying devices.

Figure 4C:
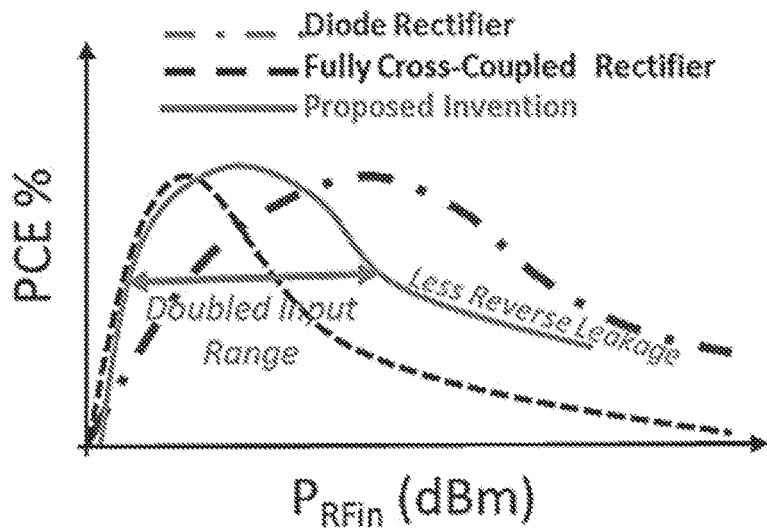

As illustrated in FIG. 4B, when RF input voltage 403 is higher than the output DC voltage 406, the rectifying MOSFETS conduct in forward direction (409). When the instantaneous RF input voltage 403 is less than the output DC voltage 406, the rectifying device conducts and leaks in reverse direction (412). Moreover, this reverse leakage current 412 increases as the RF input level increases and limits the overall PCE as shown in FIG. 4A. As the RF input voltage 403 increases, the reverse leakage 412 increases more than the forward current 409 increase. So, the overall power conversion efficiency degrades as the RF input voltage increases. In contrast, the wide range rectifier architecture 300 extends the power conversion efficiency over a wider range of RF input power as shown in FIG. 4C, which can enhance the PCE.

Figure 5A:
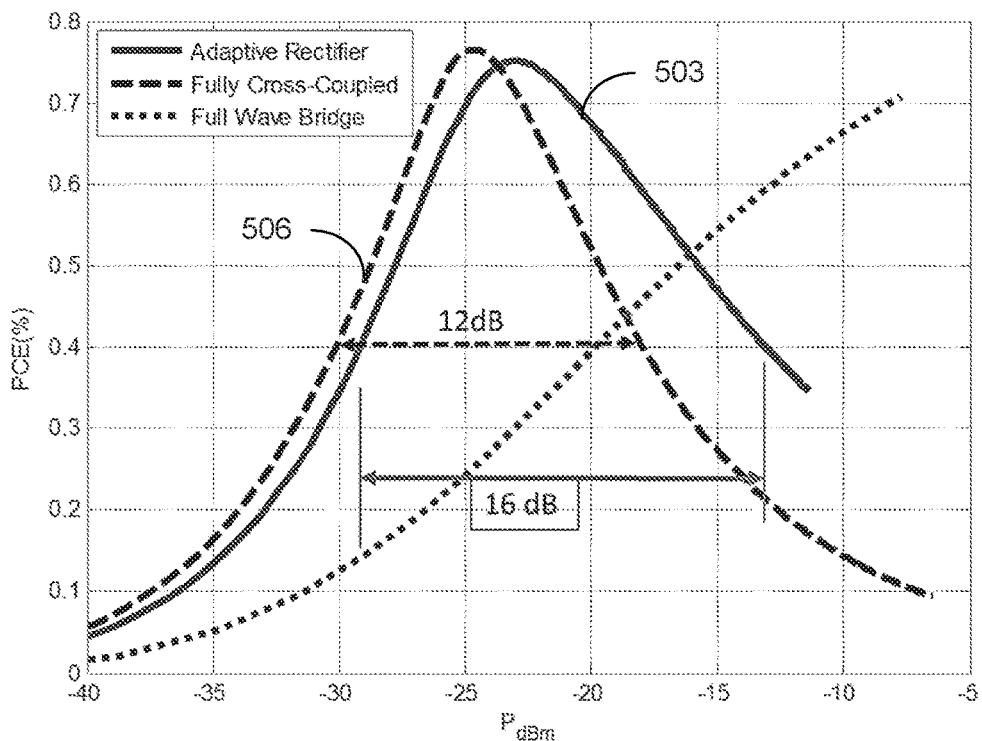
FIGS. 5A and 5B are plots illustrating examples of simulation results of an adaptive and/or reconfigurable wide range rectifier in accordance with various embodiments of the present disclosure.
Figure 5B:
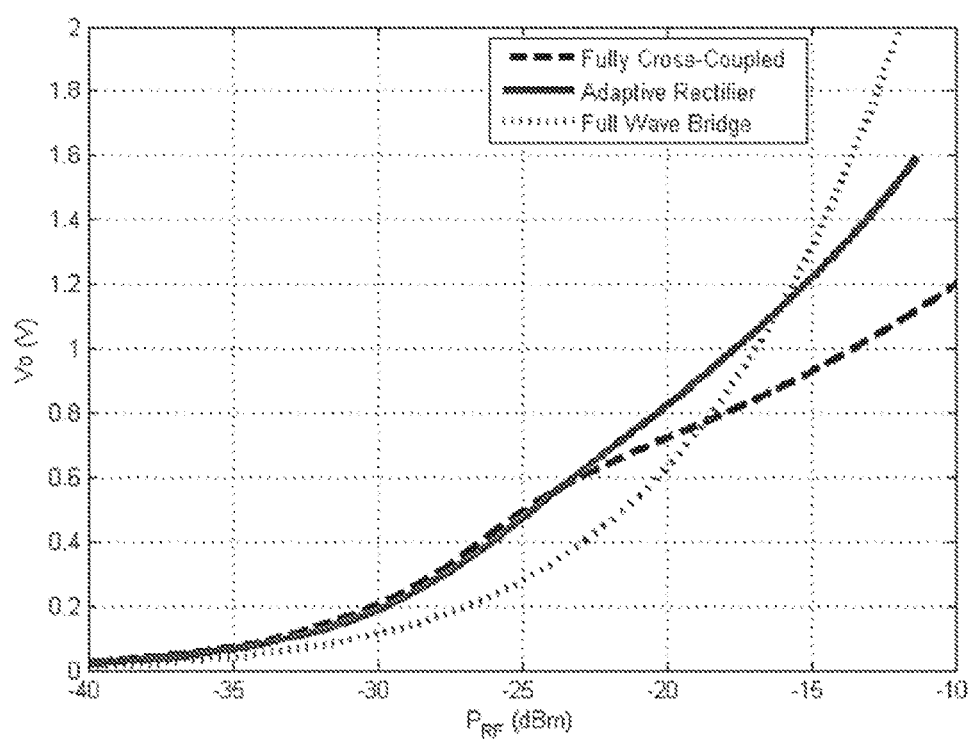

Simulation results of a wide range RF-to-DC power converter using the wide range rectifier architecture 300a of FIG. 3A were implemented on CMOS 0.18 μm technology and are presented in FIGS. 5A and 5B. The simulations used an IC industry standard, Electronic Design Automation (EDA) Simulator from Cadence. The performance of the rectifier 300a is compared with the full wave bridge rectifier of FIG. 2A and the fully cross coupled rectifier 200 of FIG. 2B. The presented results are based on an RF input signal at 950 MHz and a 100 kΩ loading to test the performance of a single stage of the rectifier architecture 300 at the UHF range used for RFID applications.

The RF-to-DC power conversion efficiency (PCE) is shown in FIG. 5A for the wide range rectifier 300a (curve 503) and the PCE of the standard fully cross-coupled rectifier 200 (curve 506) over the RF input power range. Both architectures show similar peak power conversion efficiency of about 75%. However, the wide range rectifier 300 is able to maintain a PCE that is higher than 40% for a 16 dB (39.8 ratio) range of RF input power levels, which is more than double the 12 dB range of the standard fully cross-coupled rectifier 200 (a 15.8 ratio).

At the same time, the wide range rectifier 300a provides a higher output voltage than the standard fully cross-coupled rectifier 200 as shown in FIG. 5B. This boost in PCE performance is achieved while maintaining a superior sensitivity as illustrated in FIG. 5B. The adaptive wide range rectifier 300 can provide a DC output voltage of one Volt from −17 dBm RF input power. On the other hand, the full wave diode bridge rectifier shows very poor sensitivity and efficiency at low and mid-range of input power.

In this disclosure, a highly efficient, fully cross-coupled rectifier 300 with a wide input range was presented. The architecture of the wide range rectifier 300 and its performance were discussed and compared with the standard fully cross-coupled rectifier 200. Self-adaptive architectures were discussed by which no additional components and no external control are needed. The wide range rectifier architecture 300 achieves a peak RF-to-DC power conversion efficiency of 75% and maintains a power conversion efficiency higher than 40% for 16 dBm dynamic range of RF input power levels, which is more than double the input range of the fully cross-coupled rectifier 200. At same time, the wide range rectifier 300 achieves sensitivity of −17 dBm RF input power to provide output DC voltage of one Volt to a typical load of 100 kΩ.

A self-biased, cross-coupled differential rectifier was examined with enhanced power-conversion efficiency over an extended range of input power. A prototype was designed for UHF 433 MHz RF power-harvesting applications and was implemented using 0.18 μm CMOS technology. The proposed self-biased rectifier architecture was compared to a conventional cross-coupled rectifier. Validation demonstrated an efficiency improvement of more than 40% and an input power range extension of more than 50%. A sensitivity of −15.2 dBm (30 µW) input power for 1V output voltage and a peak power-conversion efficiency of 65% are achieved for a 50 kΩ load.

Traditionally, AC-DC power converters have been realized using diode-based architectures such as the Greinacher cell, the Dickson multiplier, or a full-wave bridge rectifier. Diode-based rectifiers have simply been realized in CMOS technology using diode-connected transistors, such as the Dickson rectifier shown in FIG. 6A. However, they suffer from poor sensitivity at low input power and from high dropout voltage that degrades their power conversion efficiency at mid-to-high input power. Enhanced sensitivity can be achieved using Schottky diodes that require additional fabrication steps and hence are seldom offered in conventional CMOS processes. On the other hand, the differential, fully cross-coupled (FX) rectifier 200, shown in FIG. 6B (and FIG. 2B), is widely used in RFID applications due to its improved sensitivity and high peak efficiency. However, this improvement is gained at the expense of the reverse characteristic of the rectifying devices, because the rectifying cross-coupled transistor is still a bidirectional device—unlike diodes or diode-connected transistors. Hence, it conducts in a reverse direction $I_{RVS}$ once the instantaneous value of the RF signal, $V_{RF}$, becomes lower than the output DC voltage, $V_{DD}$, in every RF cycle, as shown in FIG. 7A. This periodic reverse leakage is exacerbated as the RF power level grows, degrading the rectifier conversion efficiency at high input power, as shown in FIG. 7B. Consequently, the rectifier operates efficiently within a limited range of input power. To evaluate different rectifier architectures, a dynamic range is defined as the input-power range at which the rectifier maintains a power conversion efficiency (PCE) higher than 80% of its peak efficiency.

A low MHz adaptive architecture can reconfigure the rectifier stage as a diode-connected voltage doubler or as a half cross-coupled rectifier based on the input power level. However, it utilizes active diodes driven by fast comparators that are not power efficient at high RF frequencies such as UHF 433 MHz or higher. A multistage configuration can be used to enhance the efficiency of the cross-coupled rectifier by rewiring stages as a series or parallel multistage rectifier. Though this technique extends the efficiency of the cross-coupled rectifier over a wide range of input power, it includes multiple stages with high input capacitance and low input resistance, thus complicating the matching network design. An adaptive offset calibration technique can be used to compensate the threshold voltage, $V_{th}$, in diode based rectifiers to improve their sensitivity. However, it utilizes two more auxiliary, multistage rectifiers to compensate the $V_{th}$ of the main rectifier, thus occupying a larger area, adding more losses, and degrading the PCE.

A self-biased, cross-coupled, differential CMOS rectifier 300f (FIG. 3F) was experimentally validated and found to have enhanced efficiency over wider input range than both the diode connected rectifier of FIG. 6A and the cross-coupled rectifier 200 of FIG. 6B. This facilitates reliable and efficient RF-to-DC power conversion at varying RF power levels, and it adds more spatial freedom between the wireless power transmitter and receiver. The self-biased cross-coupled architecture is illustrated by the schematic diagram in FIG. 8 and its operational concept and the experimental results are discussed and compared with measurements of a fabricated conventional FX rectifier 200. The proposed self-biased rectifier 300f was implemented in a 0.18 µm CMOS process technology, and occupied a 130 µm×130 µm active area. A die microphotograph of the fabricated self-biased rectifier 300f is shown in FIG. 9, with an enlarged view of the active area including the feedback resistors (RFB). A conventional FX rectifier was implemented on the same die for a fair comparison to the self-biased rectifier 300f using an identical test setup and conditions. The RF measurement setup included an Agilent's vector network analyzer (N5225A) and a digital multimeter (34420A).

Figure 8:
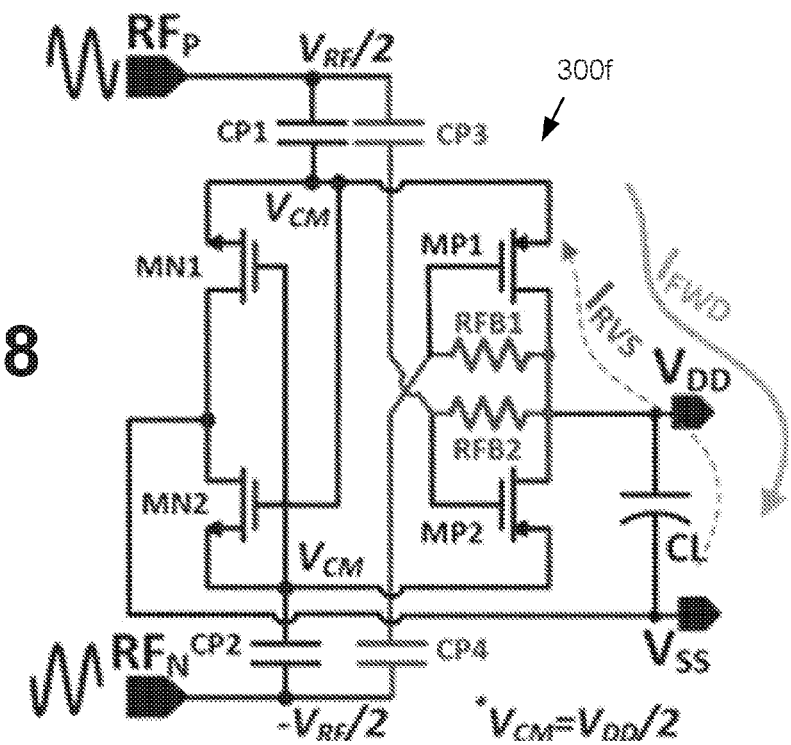
FIG. 8 is a schematic diagram illustrating an example of a self-biased rectifier of FIG. 3F in accordance with various embodiments of the present disclosure.
Figure 9:
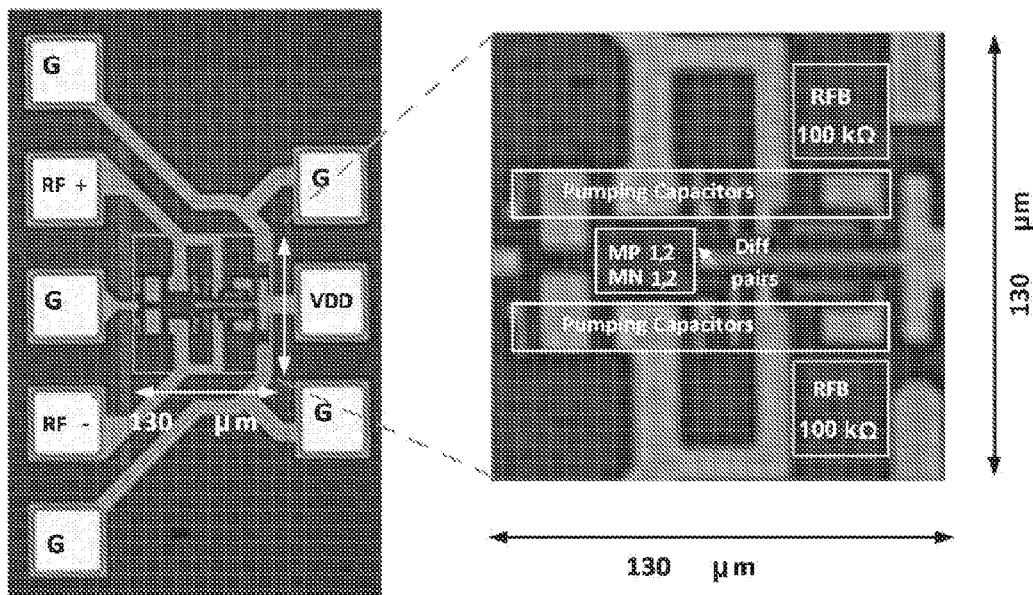
FIG. 9 are die microphotographs of a fabricated self-biased rectifier of FIG. 8 in accordance with various embodiments of the present disclosure.

As shown in the schematic diagram of FIG. 8, the fabricated self-biased cross-coupled rectifier 300f utilizes the cross-coupled configuration with the differential-drive capability to maintain good sensitivity at low input power by operating in the linear region and holding a low dropout voltage. Moreover, a self-biasing mechanism is added to limit the reverse leakage when sensing high input power. The self-biasing mechanism can control the conduction of the rectifying devices by raising their effective turn-on voltage at high RF power levels. A simple implementation of this mechanism can be achieved by applying the output DC voltage directly to the controlling gates of the rectifying transistors (MP1 and MP2) without disturbing the RF signal at the differential inputs. This can be achieved by decoupling the DC voltage of the rectifying PMOS MP1/MP2 gates apart of their corresponding NMOS MN1/NM2 transistors using capacitors CP3 and CP4 and then, applying the DC self-bias using an RF choke (RFC) coil (not shown) that is DC short circuit and AC open circuit. It is worth noting that the self-biasing branch is connected to a MOSFET gate: hence, no DC current passes through it, whereas the self-biasing RFC branches can be simply replaced by high feedback resistors (e.g., RFB1 and RFB2 with a resistance of about 100 kΩ) without loading the RF inputs, as shown in FIG. 8.

The operating point of the self-biased cross-coupled rectifying device (MP1 in FIG. 8) was compared to the conventional cross-coupled and diode-connected rectifying devices (MP1 in FIGS. 6A and 6B, respectively). FIG. 10 illustrates the operating point of the rectifying device (MP1) in the three configurations: a diode-connected transistor (FIG. 6A); a cross-coupled transistor (FIG. 6B); and a self-biased transistor (FIG. 8). Each rectifying device MP1 connects the AC-coupled RF node (RF superimposed on a common mode $V_{CM}=V_{DD}/2$) at its input terminal to the output $V_{DD}$ point.

As shown in FIG. 10(a), the gate and drain of the diode-connected device MP1 are tied to the output $V_{DD}$ to act as a two-terminal diode. In the case of the conventional cross-coupled device MP1 shown in FIG. 10(b), the gate is attached to the $RF_N$ node (=−$V_{RF}/2$ superimposed on $V_{DD}/2$). However in the self-biased cross-coupled device MP1 shown in FIG. 10(c), the gate $RF_N$ signal is superimposed on $V_{DD}$. Note that both the self-biased cross-coupled device of FIG. 10(b) and the diode-connected device of FIG. 9(a) need a minimum turn-on RF voltage, $V_{RFmin}$, equal to threshold voltage, $V_{th}$, plus $V_{DD}/2$. This is unlike the conventional cross-coupled device of FIG. 10(c), which requires $V_{th}$ only.

Moreover, the device of FIG. 10(c) conducts in the linear region and holds a dropout voltage of less than or equal to its overdrive voltage, $V_{eff}$, passing a higher output voltage than the diode-connected device of FIG. 10(a), which requires a dropout of $V_{th}+V_{eff}$. As a result, the self-biased cross-coupled device of FIG. 10(c) retains moderate sensitivity (i.e., it generates a higher output voltage at the same RF input power) compared to the diode-connected device of FIG. 9(a). This is derived from the operating points shown in FIG. 10, and it matches the simulated dropout voltages of the three rectifiers at the same input power level of 37 µW, as shown by the simulation results of the dropout voltage ($V_{SD}$) in FIG. 11(a).

During the periodic RF signal transitions, the reverse leakage of the diode-connected device of FIG. 10(a) is negligible, while the conventional cross-coupled device of FIG. 10(b) is strongly biased by $V_{SG(RVS)}=V_{RF}/2+V_{DD}/2$ in the reverse direction. Accordingly, the reverse current lobes increase at the 37 µW input power level, as shown by the simulation results of the drain current ($I_{DP}$) in the rectifying PMOS devices of the Dickson, conventional FX, and proposed self-biased cross-coupled rectifiers in FIG. 11(b). On the other hand, as depicted in FIG. 10(c), the device is biased only at $V_{SG(RVS)}=V_{RF}/2$, leading to reduced reverse current lobes, as shown in FIG. 11(b). It worth noting that, during the negative RF half cycle, the gate of MP1 in the conventional FX rectifier of FIG. 10(b) and self-biased rectifier of FIG. 10(c) is positively biased, shutting down its current completely, like the reverse-biased, diode-connected device.

Figure 12:
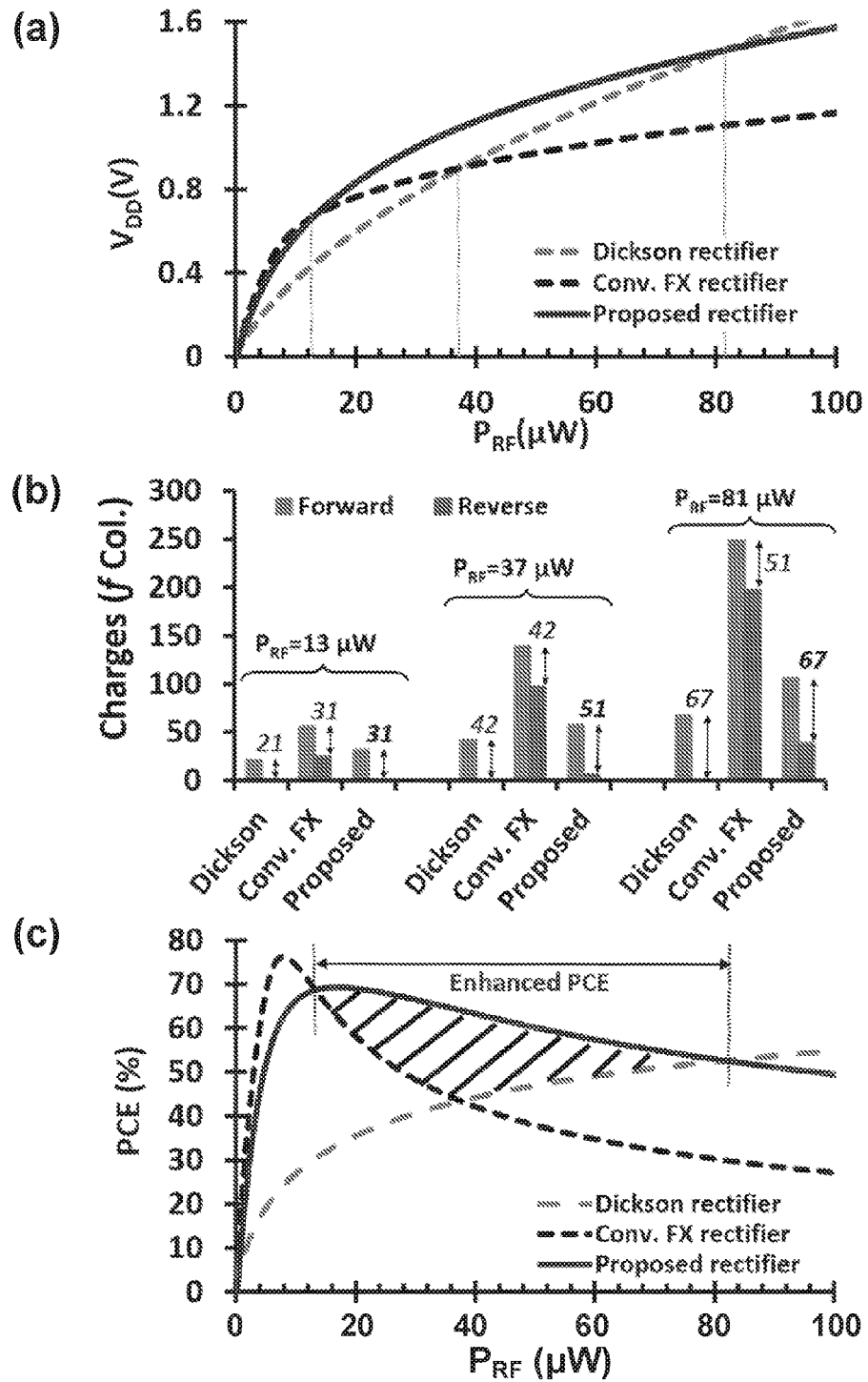

FIG. 12(a) shows the simulation of the output voltage $V_{DD}$ versus the input power $P_{RF}$ for all three rectifiers for a load of 50 kΩ. At low RF power, the proposed self-biased rectifier 300f out performs the Dickson rectifier while it out performs the FX rectifier at high RF power. This may be explained by plotting the alternating charges flowing in MP1 per RF cycle $Q_P$ (with the left bar representing the forward harvested charges and the right bar representing the reverse leakage charges) at three levels of distinct RF power $P_{RF}$, as shown in FIG. 12(b). The simulated PCE of the three rectifiers versus input power $P_{RF}$ is plotted in FIG. 12(c). As shown in FIG. 12, the conventional FX rectifier 200 (FIG. 6B) has a peak PCE at low RF power, but it falls off rapidly due to its high reverse leakage current, which is shown in FIG. 11(b). On the other hand, the Dickson (diode-based) rectifier (FIG. 6A) displays a moderate PCE at the high RF power levels but suffers from poor efficiency at low input power due to its high dropout voltage, as shown in FIG. 11(a). Conversely, the proposed self-biased cross-coupled rectifier 300f (FIG. 8) achieves a wider dynamic range with a slight decrease in its peak PCE relative to the conventional FX rectifier 200.

A comparison of the three rectifying devices is summarized in the table of FIG. 13, where the self-biased rectifying device 300f shows competitive advantages of low dropout voltage, as shown in FIG. 11(a), and hence low dissipation loss and better sensitivity than the diode-connected device of FIG. 6A. At the same time, the self-biased rectifying device 300f shows lower reverse leakage and wider input range than the conventional cross-coupled device 200, as shown in FIGS. 11(b) and 12, respectively.

The PCE of the fabricated rectifiers was measured with a single tone 433 MHz signal at different input power levels, and the output DC voltage was recorded. After de-embedding the reflection and transmission losses, the net input power was calculated and the power conversion efficiency for the proposed self-biased rectifier 300f and the conventional FX rectifier 200 was plotted in FIG. 14 versus the input power at different loads. The measured PCE of the self-biased rectifier 300f (solid curves) and the conventional FX rectifier 200 (dashed curves) was plotted for three loads: 50 kΩ, 100 kΩ, and 200 kΩ. Although the self-biased rectifier 300f exhibited a lower peak PCE (about 65%) than the conventional rectifier 200, whose peak PCE was about 75%, the self-biased architecture maintained its power conversion efficiency over a broader dynamic range of input power. Thus, the proposed self-biased rectifier 300f can operate efficiently at different RF power levels, enabling robust wireless powering from varying transmission distances or within unstable environments.

Figure 15:
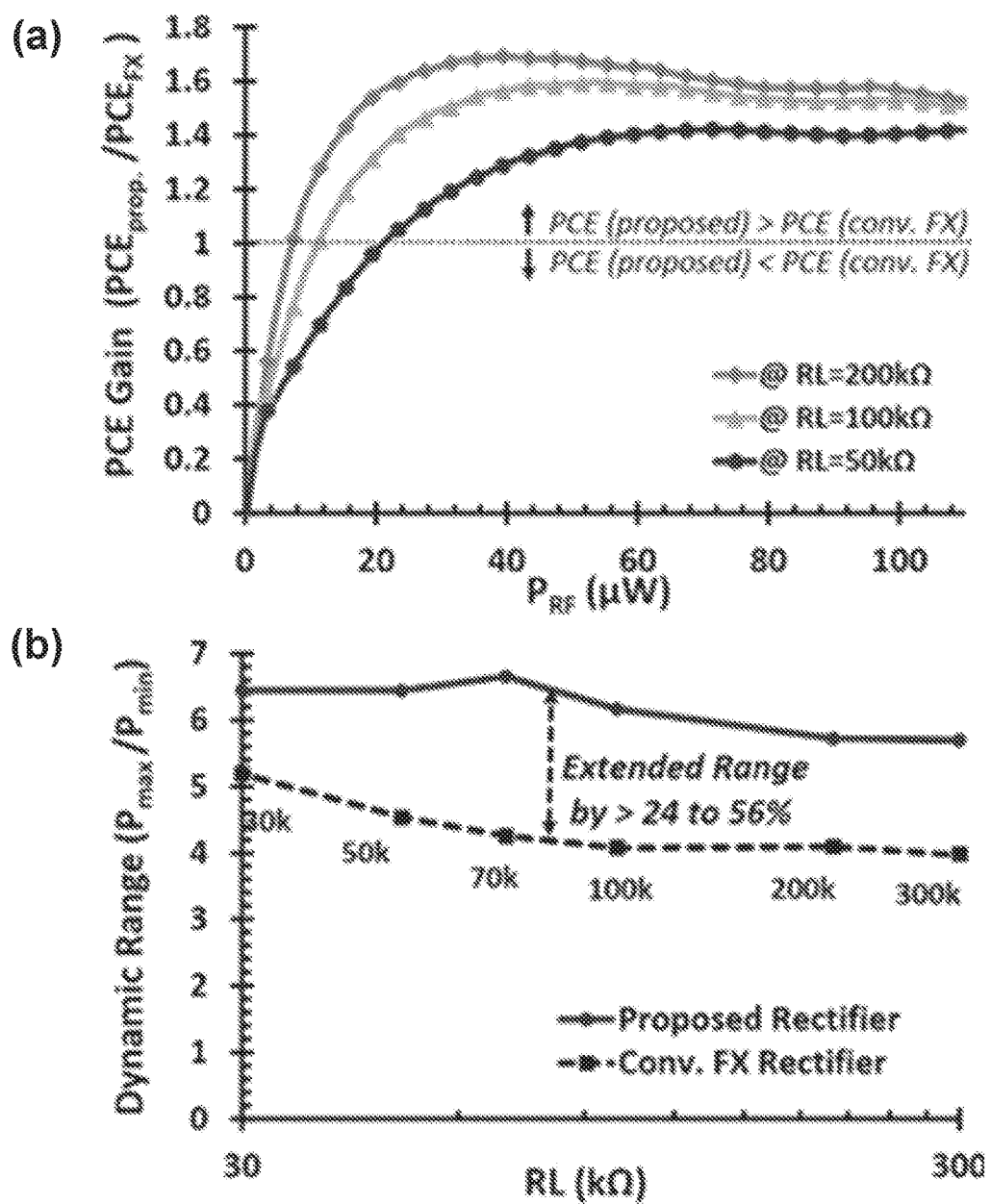
Figure 16:
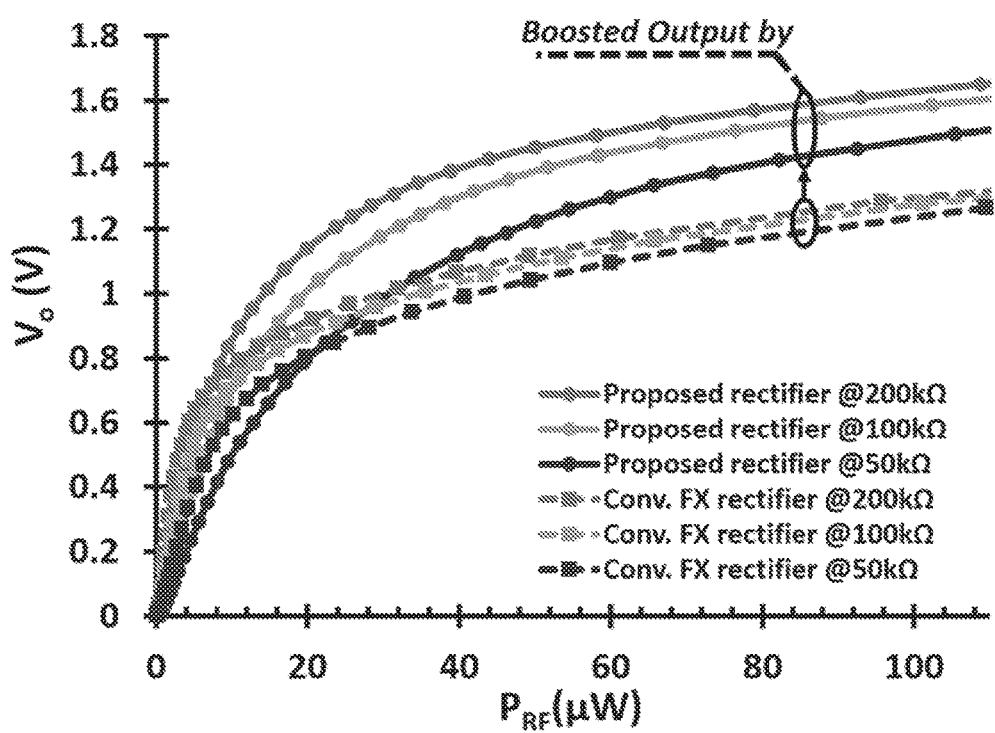

To elucidate the relative PCE enhancement of the proposed rectifier, the ratio of the self-biased rectifier PCE over the conventional FX rectifier PCE is plotted in FIG. 15(a) for variable loads of $R_L$=50 kΩ, 100 kΩ, and 200 kΩ. An approximately 40% to 70% efficiency improvement was achieved in the proposed self-biased rectifier 300f relative to the conventional FX rectifier 200. Moreover, the self-biased rectifier 300f maintained the achieved improvement of PCE over a wider input range at different loading conditions, as depicted in FIGS. 14 and 15(a). To further illustrate this point, the dynamic range of input power to [$P_{min}$ to $P_{max}$] at which each rectifier maintained 80% of its peak efficiency was represented as the ratio of $P_{max}/P_{min}$ and is compared in FIG. 15(b) for the self-biased rectifier 300f and conventional FX rectifier 200 over different loading conditions. Evidentially, the proposed self-biased rectifier 300f achieved a higher dynamic range across a wide range of loading conditions (from 30 kΩ to 300 kΩ). FIG. 16 depicts the measured output DC voltage versus input power level for the self-biased rectifier 300f and conventional FX rectifier 200 equally loaded by 50 kΩ, 100 kΩ and 200 kΩ. At the same input power, the proposed self-biased rectifier 300f delivered higher DC output voltage than the conventional FX rectifier 200 by 20% to 30%.

A performance comparison of the self-biased rectifier 300f versus recent ISM 433 MHz rectifiers is summarized in the table in FIG. 17. The proposed self-biased rectifier 300f shows 2× improvement in dynamic range and 5× enhancement in efficiency relative to the fully cross-coupled rectifier with inter-stage RF injection described in "A novel cascading scheme to improve the performance of voltage multiplier circuits" by Chouhan et al. (*Analog Integr. Circ. Sig. Process*, vol. 84, no. 3, pp. 373-381, 2015). More than 50% wider dynamic range and doubled efficiency was achieved compared to the Dickson rectifier with multiple $V_{th}$ offset cancellation described in "Auto-calibrating threshold compensation technique for RF energy harvesters" by Gharehbaghi et al. (*IEEE RFIC Symposium*, May 2015, pp. 179-182) with a 9× chip area saving. The proposed self-biased, cross-coupled, differential rectifier 300f was shown to provide 50% enhanced PCE over a wide range of input power levels and under different loading conditions when compared to other rectifiers. A sensitivity of ($P_{in}$=30 µW at $V_o$=1V) and peak PCE=65.3% were achieved for a 50 kΩ load.

A wide-range, differential cross-coupled rectifier 300k (FIG. 3K) was also examined with an extended dynamic range of input RF power that enables wireless powering from varying distances. The proposed self-adaptive architecture can mitigate the reverse-leakage problem in conventional, cross-coupled rectifiers without degrading sensitivity. A prototype was designed for UHF RFID applications, and was implemented using 0.18 µm CMOS technology. On-chip measurements demonstrate a sensitivity of −18 dBm for 1V output over a 100 kΩ load and a peak RF-to-DC power conversion efficiency of 65%. A conventional, fully cross-coupled rectifier was fabricated alongside for comparison and the proposed rectifier shows more than 2× increase in dynamic range and a 25% boosting in output voltage than the conventional rectifier.

Figure 18:
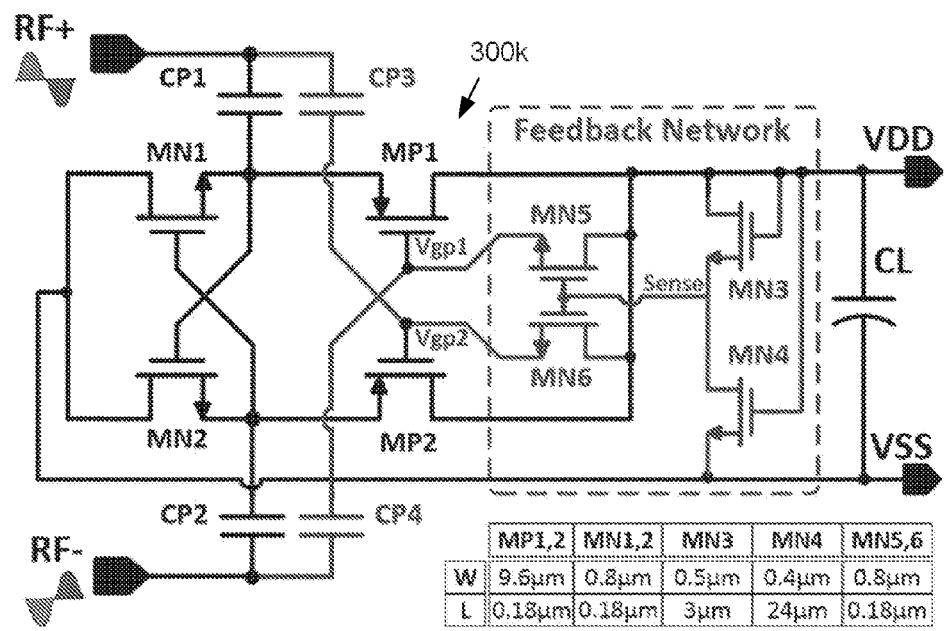
FIG. 18 is a schematic diagram illustrating an example of an adaptive rectifier of FIG. 3K in accordance with various embodiments of the present disclosure.
Figure 19:
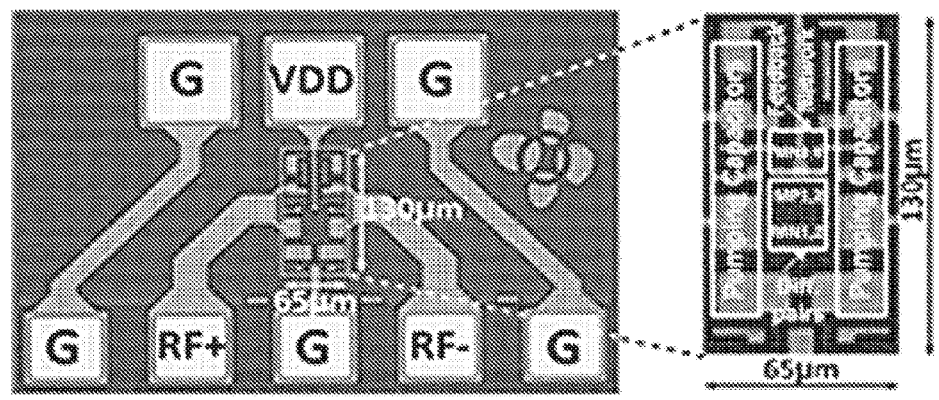
FIG. 19 are die microphotographs of a fabricated adaptive rectifier of FIG. 18 in accordance with various embodiments of the present disclosure.

A wide-range, differential RF-to-DC power converter stage using an adaptive, self-biasing technique was examined and found to extend the optimal input range at which the rectifier maintains 90% of its peak power conversion efficiency over a wider input range than conventional rectifiers. This can be achieved without trading off the sensitivity advantage of the cross-coupled scheme. The adaptive architecture is illustrated by the schematic diagram in FIG. 18 and the experimental results are presented. The proposed adaptive rectifier 300k was implemented in a 0.18 µm CMOS process technology and occupied a 65×130 µm active area including the two additional capacitors and transistors. A microphotograph of the module including the testing pads is shown in FIG. 19, with an enlarged view of the active area. All tests are repeated for a single-stage, conventional, FX rectifier fabricated on the same die using the same test setup for comparison purposes to illustrate the advantage of the cross-coupled scheme.

Referring back to FIG. 18, the operation principle of the proposed adaptive rectifier 300k is based on limiting the conduction of the rectifying devices at high input power range at which the reverse leakage becomes severe. This is achieved by raising the DC bias of the rectifying transistors (MP1 and MP2) gates as the input RF power increases. The proposed rectifier is comprised of four driving MOSFETs (MP1, MP2 MN1 and MN2) as rectifying devices that are connected in a fully, cross-coupled manner to enhance the rectifier sensitivity. However, unlike the conventional cross-coupled rectifier shown in FIG. 2B, the DC voltage of the gates of MP1 and MP2 are decoupled from their corresponding NMOS gates, while the AC voltages of the PMOS gates are coupled to the corresponding AC voltage of NMOS gates via two pumping capacitors CP3 and CP4.

To control the conduction of the rectifying devices, self DC biasing can be dynamically applied to the PMOS gates only in the presence of high input RF power. While this self-biasing can be implemented in various ways, a simple yet dynamic approach is adopted by using two feedback transistors MN5 and MN6, as shown in FIG. 18. Here, MN5 and MN6 are controlled by a 'Sense' signal which can be derived from the output DC voltage (VDD) using a potential divider of a diode-connected transistor MN3 and a linear transistor MN4.

Figure 20:
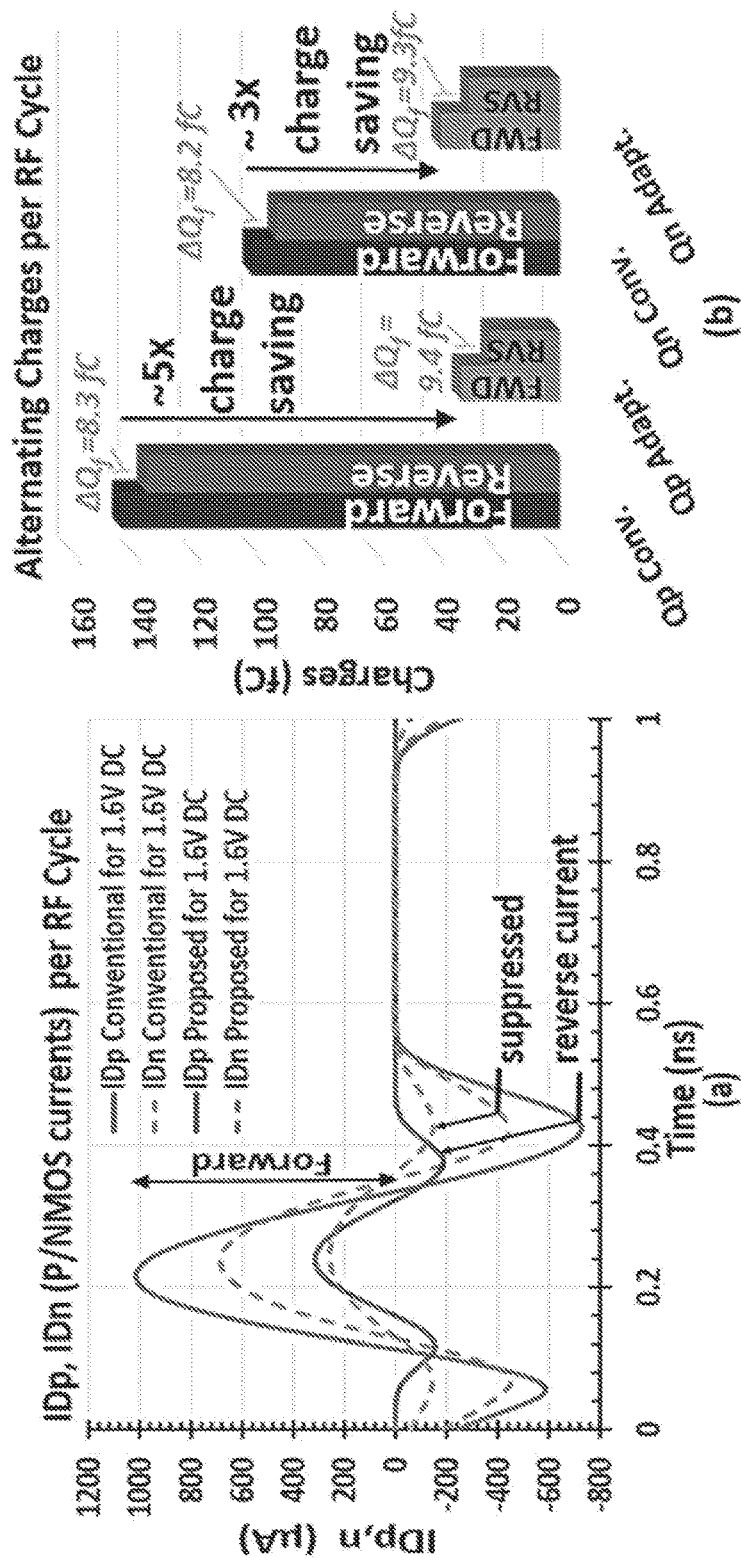
FIG. 20 includes plots illustrating examples of simulation results of the conventional FX rectifier of FIG. 6B and and adaptive rectifier of FIG. 18 in accordance with various embodiments of the present disclosure.

FIG. 20(a) shows the simulated currents of the rectifying PMOS devices (solid curves) and NMOS devices (dashed curves) in a conventional FX rectifier 200 (FIG. 2B) and proposed adaptive rectifier 300k (FIG. 18). In the presence of high input RF power, the output DC voltage and the corresponding 'Sense' signal will have high voltage levels. This high 'Sense' signal switches on the biasing transistors (MN5 and MN6), thus applying dynamic biasing to the gates of the PMOS rectifying devices to limit their reverse leakage, as shown in FIG. 20(a). Although the DC bias applied to the PMOS gate limits both its forward and reverse conductivity, it does not increase its conduction loss as it holds low voltage drop by operating in linear region while passing lower current than the conventional rectifier, as shown in FIG. 20(a). The rectifying PMOS and NMOS currents and alternating charges per RF cycle that produce 1.6V output DC voltage from the proposed and conventional rectifiers are plotted in FIGS. 20(a) and 20(b), respectively. As expected, both rectifiers utilize the same net charges, $\Delta Q_f$, to produce the same output voltage for equal loading. However, the magnitude of alternating charges flowing back and forth is much larger (5×) in the case of the conventional FX rectifier 200 compared to the proposed adaptive rectifier 300k, demanding higher RF power for the same output voltage. Although the adaptive bias circuit is applied to the PMOS transistors in the example of FIG. 18, reverse leakage for NMOS can also be reduced due to the reduced effective bias leading to a 3× charge saving, as shown in FIG. 20(b).

On the other hand, at low RF power, the sampled 'Sense' signal is low and MN5 and MN6 are off. At the same time, the RF voltage can still be applied differentially to the gate-source terminals of the four rectifying devices as in the conventional, cross-coupled rectifier 200. This preserves the main sensitivity advantage of the cross-coupled scheme to the low input RF power levels. Moreover, the proposed adaptive implementation has minimal loading effects. The sensing branch (MN3 and MN4) can be designed such that it has a low quiescent current (e.g., about 1.3 µA at $V_o$=1.2V, $R_L$=100 kΩ) by increasing the length of the diode connected MN3 and the linear-resistive MN4, while it is OFF at $V_O<V_{th}$. Also, the biasing branches (MN5 and MN6) have no static power consumption as they are connected to gates of MOS devices (MP1 and MP2) and to the decoupling capacitors.

Figure 21:
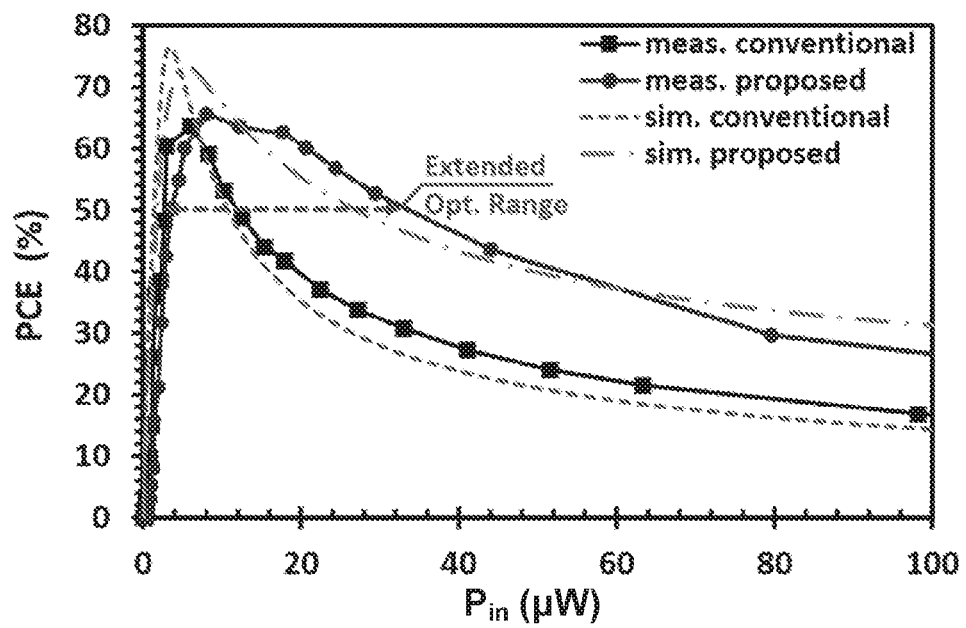
FIGS. 21 and 22 include plots illustrating examples of evaluation results of the conventional FX rectifier of FIG. 6B and adaptive rectifier of FIG. 18 in accordance with various embodiments of the present disclosure
Figure 22:
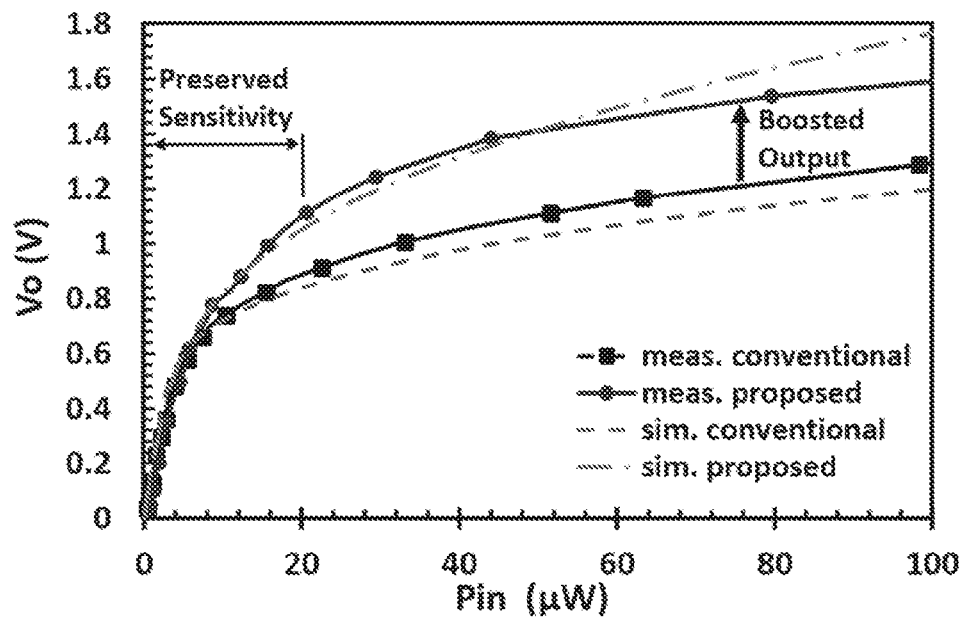

During the evaluation, the input reflection coefficient was first measured using Agilent's vector network analyzer (N5225A) at different input RF power levels. Then, the input RF power ($P_{in}$) was deduced from the RF source power level after the reflection and transmission losses were de-embedded. The RF measurements were carried out using a 1 GHz sinusoidal signal fed to a single-stage adaptive rectifier loaded by a 100 kΩ. The measured RF-to-DC power conversion efficiency (PCE) is in good agreement with the simulation results for the proposed adaptive rectifier 300k and the conventional FX rectifier 200 as shown in FIG. 21, where the simulated results are plotted with dashed curves and the measured results are plotted with solid curves. The adaptive rectifier 300k was verified to maintain a high PCE over an extended input range of RF power (more than 2× compared to the conventional FX rectifier 200), as shown in FIG. 21. This enables the proposed adaptive rectifier 300k to operate at both low RF power level (e.g., at a long wireless power range) with superior sensitivity and also at high RF power level with extended efficiency. The measured output DC voltage of the proposed adaptive rectifier 300k and the conventional FX rectifier 200 are shown in FIG. 22, where the simulated results are plotted with dashed curves and the measured results are plotted with solid curves. At the same input RF power level, the adaptive rectifier 300k achieves a boosted output DC voltage which is 25% higher than that of the conventional FX rectifier 200 under the same loading conditions. Furthermore, voltage boosting ranges from 24.5% to 29% were measured over varying loads from 50 k to 500 kΩ. While the proposed adaptive rectifier 300k achieves extended optimal range, it still maintains a high peak efficiency of 65% and sensitivity of −18 dBm for 1V output over 100 kΩ.

A performance comparison of the adaptive rectifier 300k with prior art rectifiers is presented in the table in FIG. 23. The optimal range is defined as the input power range over which the rectifier maintains power conversion efficiency higher than 90% of its peak efficiency. The proposed adaptive architecture achieved a much wider optimal range compared to previously reported architectures; including the most common, fully cross-coupled rectifier in "High-efficiency differential-drive CMOS rectifier for UHF RFIDs" by Kotani et al, (*IEEE J. Solid-State Circuits*, vol. 44, no. 11, pp. 3011-3018, Nov, 2009) with 5 dB better sensitivity. More than 2× improvement was achieved compared to the enhanced, 36-stage voltage doubler with floating gate devices in "Efficient far-field radio frequency energy harvesting for passively powered sensor networks" by Le et al. (*IEEE J. Solid State Circuits*, vol. 43, no. 5, pp. 1287-1302, May 2008). Also, the proposed architecture provides a wide optimal range without sacrificing neither the PCE as in "Codesign of a CMOS rectifier and small loop antenna for highly sensitive RF energy harvesters" by Stoopman et al. (*IEEE J. Solid-State Circuits*, vol. 49, no. 3, pp. 622-634, March 2014) nor sensitivity as in Kotani and Le. Although, a reconfigurable 4-stage rectifier in "A reconfigurable differential CMOS RF energy scavenger with 60% peak efficiency and −21 dBm sensitivity" by Scorcioni et al. (*IEEE Microw. Wireless Compon. Lett.*, 2013) shows comparable optimal range, it utilizes multi-stage re-configuration and was measured over a tracking load (a regulator with external reference). It is worth noting that the proposed single-stage adaptive architecture can be combined with this tracking load and multi-stage techniques in Scorcioni and "2.4-GHz High-efficiency adaptive power harvester" by Li et al. (*IEEE Trans, VLSI Syst.*, vol. PP, no. 99, p. 1, 2013) to build a wider range, multi-stage rectifier.

The self-adaptive, differential, cross-coupled rectifier 300k can operate with an extended input RF power range without trading off the sensitivity ($P_{in}$=−18 dBm at $V_O$=1V) or the peak power conversion efficiency (peak PCE=65%). The architecture of the adaptive rectifier 300k was presented, and its performance was verified and compared with the conventional, fully cross-coupled rectifier 200.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A radio frequency to direct current (RF-to-DC) converter, comprising:
    first and second RF ports;
    first and second pairs of pumping capacitors, the first pair of pumping capacitors being connected in parallel to the first RF port, and the second pair of pumping capacitors being connected in parallel to the second RF port;
    a fully cross-coupled rectification circuit connected between the first and second pairs of pumping capacitors, the fully cross-coupled rectification circuit including a first pair of rectifying transistors and a second pair of rectifying transistors; and
    a feedback circuit configured to provide feedback bias signals to gates of the first pair of rectifying transistors via feedback branch elements,
    wherein the first and second pairs of the pumping capacitors are connected to gates of the first pair of rectifying transistors and to gates of the second pair of rectifying transistors so that the gates of the first pair of rectifying transistors are decoupled from the gates of the second pair of rectifying transistors, and
    wherein the gates of the first pair of rectifying transistors are biased with the feedback bias signals independent of the gates of the second pair of rectifying transistors.

2. The RF-to-DC converter of claim 1, wherein the feedback branch elements comprise controlled elements.

3. The RF-to-DC converter of claim 2, wherein the controlled elements are MOSFET transistors.

4. The RF-to-DC converter of claim 1, wherein the feedback branch elements are resistors.

5. The RF-to-DC converter of claim 1, wherein the feedback bias signals are supplied from a common control input via the feedback branch elements.

6. The RF-to-DC converter of claim 1, wherein the feedback bias signals are supplied from a common bias input via the feedback branch elements, the feedback bias signals controlled via a common control input.

7. The RF-to-DC converter of claim 6, comprising a power management unit (PMU) coupled to the common control input.

8. The RF-to-DC converter of claim 7, wherein the PMU provides a control signal to the common control input based at least in part upon an output voltage of the RF-to-DC converter.

9. The RF-to-DC converter of claim 1, wherein the feedback bias signals are supplied from a common output connection of the first pair of rectifying transistors via the feedback branch elements.

10. The RF-to-DC converter of claim 9, wherein the common output connection couples drains of the first pair of rectifying transistors.

11. A method, comprising:
    receiving a radio frequency (RF) signal at first and second RF ports;
    pumping the RF signal through first and second pairs of pumping capacitors, the first pair of pumping capacitors being connected in parallel to the first RF port, and the second pair of pumping capacitors being connected in parallel to the second RF port;
    rectifying the RF signal via a fully cross-coupled rectification circuit, the fully cross-coupled rectification being connected between the first and second pairs of pumping capacitors, the fully cross-coupled rectification circuit including a first pair of rectifying transistors and a second pair of rectifying transistors; and
    providing a DC output voltage from an output connection of the fully cross-coupled rectification circuit, where gating of the first pair of rectifying transistors is controlled by feedback bias signals provided to gates of the first pair of rectifying transistors via feedback branch elements,
    wherein the first and second pairs of the pumping capacitors are connected to the gates of the first pair of rectifying transistors and to the gates of the second pair of rectifying transistors so that the gates of the first pair of rectifying transistors are decoupled from the gates of the second pair of rectifying transistors, and wherein the gates of the first pair of rectifying transistors are biased with the feedback bias signals independent of the gates of the second pair of rectifying transistors.

12. The method of claim 11, comprising:
sensing the DC output voltage; and
providing a control signal to the feedback branch elements based upon the DC output voltage.

13. The method of claim 12, wherein the control signal is provided by a power management unit (PMU) configured to sample the DC output voltage.

14. The method of claim 12, wherein the control signal is provided by a transistor sensing network coupled to the output connection of the fully cross-coupled rectification circuit.

15. The method of claim 12, wherein the feedback branch elements are resistors coupled between the gates of the first pair of rectifying transistors and the output connection.

* * * * *